United States Patent
Wan et al.

(10) Patent No.: US 10,455,131 B2
(45) Date of Patent: Oct. 22, 2019

(54) WAFER-LEVEL METHODS FOR PACKING CAMERA MODULES, AND ASSOCIATED CAMERA MODULES

(71) Applicant: OmniVision Technologies, Inc., Santa Clara, CA (US)

(72) Inventors: Tsung-Wei Wan, HsinChu (TW); Wei-Ping Chen, New Taipei (TW)

(73) Assignee: OmniVision Technologies, Inc., Santa Clara, CA (US)

( * ) Notice: Subject to any disclaimer, the term of this patent is extended or adjusted under 35 U.S.C. 154(b) by 0 days.

(21) Appl. No.: 14/932,075

(22) Filed: Nov. 4, 2015

(65) Prior Publication Data

US 2016/0219203 A1      Jul. 28, 2016

Related U.S. Application Data

(63) Continuation-in-part of application No. 14/605,298, filed on Jan. 26, 2015.

(51) Int. Cl.
  *G02B 13/00*   (2006.01)
  *H04N 5/225*   (2006.01)
  (Continued)

(52) U.S. Cl.
  CPC ....... *H04N 5/2257* (2013.01); *B29C 45/1671* (2013.01); *B29D 11/00807* (2013.01);
  (Continued)

(58) Field of Classification Search
  USPC .......................................... 348/340; 359/819
  See application file for complete search history.

(56) References Cited

U.S. PATENT DOCUMENTS 8,184,195 B2 *  5/2012  Duparre ............ H01L 27/14618
                                                 348/340
2005/0275051 A1 * 12/2005 Farnworth ........ H01L 27/14618
                                                 257/433
(Continued)

FOREIGN PATENT DOCUMENTS

TW       200937642 A      9/2009
TW       201004325 A      1/2010
(Continued)

OTHER PUBLICATIONS

Application Serial No. 14605298 Office Action dated Oct. 5, 2016, 13 pages.
(Continued)

*Primary Examiner* — William R Alexander
*Assistant Examiner* — Gary W O'Neill
(74) *Attorney, Agent, or Firm* — Lathrop Gage LLP

(57) ABSTRACT

A wafer-level method for packaging a plurality of camera modules includes (a) overmolding a first housing material around a plurality of image sensors to produce a first wafer of packaged image sensors, (b) seating a plurality of lens units in the first wafer above the plurality of image sensors, respectively, and (d) overmolding a second housing material over the first wafer and around the lens units to form a second wafer of packaged camera modules, wherein each of the packaged camera modules includes one of the image sensors and one of the lens units, and the second housing material cooperates with the first housing material to secure the lens units in the second wafer.

19 Claims, 15 Drawing Sheets

(51) Int. Cl.
  *B29D 11/00* (2006.01)
  *B29C 45/16* (2006.01)
  *B29C 45/14* (2006.01)
  *B29L 11/00* (2006.01)
  *B29L 31/34* (2006.01)

(52) U.S. Cl.
  CPC .... *G02B 13/0085* (2013.01); *B29C 45/14336* (2013.01); *B29C 45/14467* (2013.01); *B29C 2045/1454* (2013.01); *B29C 2045/1673* (2013.01); *B29K 2995/0025* (2013.01); *B29L 2011/0016* (2013.01); *B29L 2031/3481* (2013.01)

(56) References Cited

U.S. PATENT DOCUMENTS

| | | | |
|---|---|---|---|
| 2006/0035415 A1 | 2/2006 | Wood et al. | |
| 2006/0132644 A1* | 6/2006 | Shangguan | H01L 27/14618 348/374 |
| 2010/0129954 A1 | 5/2010 | Kong | |
| 2011/0013292 A1* | 1/2011 | Rossi | H01L 27/14621 359/738 |
| 2011/0037886 A1* | 2/2011 | Singh | G02B 13/0085 348/340 |
| 2011/0260345 A1 | 10/2011 | Deng et al. | |
| 2012/0242814 A1 | 9/2012 | Kubala et al. | |
| 2013/0308212 A1* | 11/2013 | Kubala | G02B 13/146 359/819 |
| 2015/0036046 A1* | 2/2015 | Rudmann | H04N 5/2252 348/374 |

FOREIGN PATENT DOCUMENTS

| | | |
|---|---|---|
| TW | 201136738 A | 11/2011 |
| WO | 2009/076788 A1 | 6/2009 |

OTHER PUBLICATIONS

Office Action corresponding to Taiwanese Patent Application No. 105133778, dated Nov. 5, 2017, with English Translation, 12 pages.
Office Action corresponding to Taiwanese Patent Application No. 105102405, dated Sep. 7, 2017, with English Translation, 11 pages.
Advisory Action corresponding to U.S. Appl. No. 14/605,298, dated Jul. 6, 2017, 4 pages.
Office Action corresponding to Taiwanese Patent Application No. 105102405, dated Jun. 2, 2017—with English translation, 26 pages.
Office Action corresponding to U.S. Appl. No. 14/605,298, dated Apr. 21, 2017, 15 pages.
Non-Final Rejection in U.S. Appl. No. 14/605,298 dated Feb. 8, 2018, 12 pages.
Taiwanese Patent Application No. 105133778, English translation of Office Action dated Feb. 2, 2018, received Feb. 26, 2018, 3 pages.
Taiwanese Patent Application No. 105133778, Office Action dated Feb. 2, 2018, received Feb. 26, 2018, 3 pages.
Non-Final Rejection mailed in U.S. Appl. No. 14/605,298 dated Feb. 8, 2018, 12 pages.
Taiwan Patent Application No. 105133778, English translation of Office Action dated Mar. 12, 2019, 3 pages.

\* cited by examiner

400

FORM WAFER OF PACKAGED WAFER-LEVEL LENSES BY PARTIALLY ENCASING A PLURALITY OF WAFER-LEVEL LENSES IN A HOUSING MATERIAL, OPTIONALLY OPAQUE, SUCH THAT THE HOUSING MATERIAL FORMS A HOUSING MATERIAL FOR EACH WAFER-LEVEL LENS
410

SHAPE THE HOUSING MATERIAL SUCH THAT IT SUPPORTS THE WAFER-LEVEL LENSES BY CONTACTING THE SUBSTRATES
412

DICE WAFER OF PACKAGED WAFER-LEVEL LENSES TO FORM A PLURALITY OF PACKAGED WAFER-LEVEL LENS ASSEMBLIES
420

DICE WAFER TO PRODUCE PACKAGED WAFER-LEVEL LENS ASSEMBLIES, EACH HAVING A SINGLE WAFER-LEVEL LENS
422

DICE WAFER TO PRODUCE PACKAGED WAFER-LEVEL LENS ASSEMBLIES, EACH HAVING MULTIPLE WAFER-LEVEL LENSES
424

BOND AT LEAST ONE WAFER-LEVEL LENS ASSEMBLY TO IMAGE SENSOR MODULE
430

BOND PACKAGED WAFER-LEVEL LENS ASSEMBLY TO AN IMAGE SENSOR TO FORM A CAMERA MODULE
432

BOND PACKAGED WAFER-LEVEL LENS ASSEMBLY TO AN IMAGE SENSOR ARRAY TO FORM AN ARRAY CAMERA MODULE
434

FIG. 4

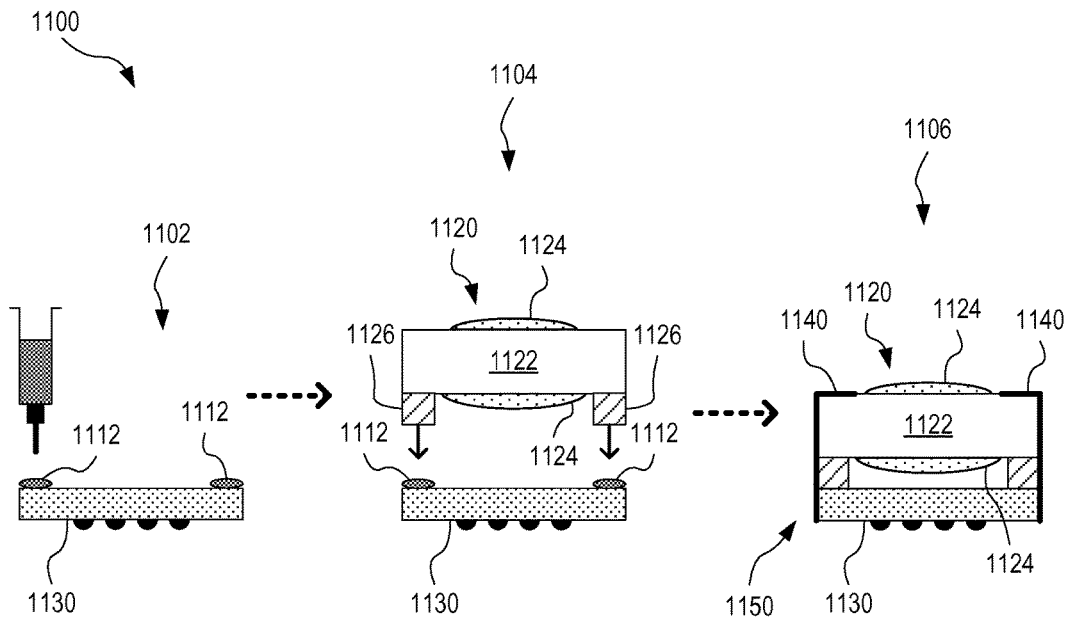
**FIG. 11
(PRIOR ART)**
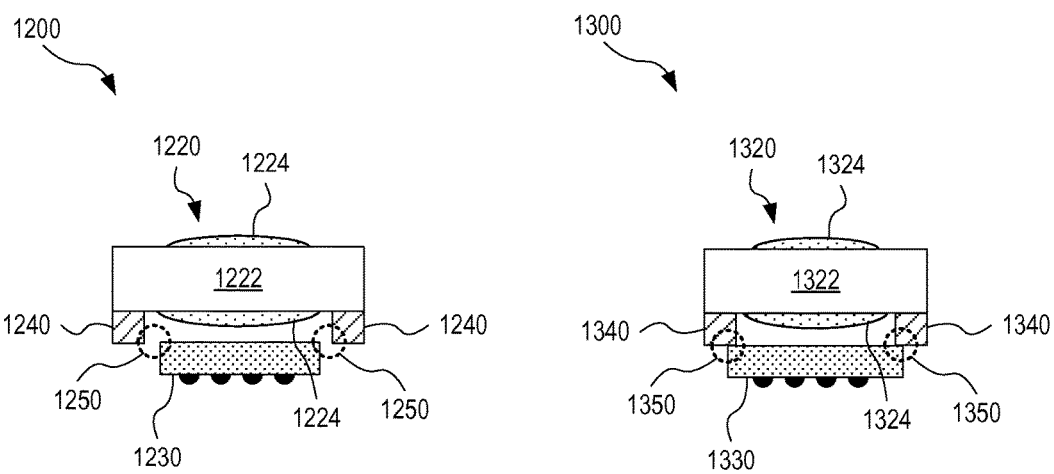
**FIG. 12
(PRIOR ART)**
**FIG. 13
(PRIOR ART)**

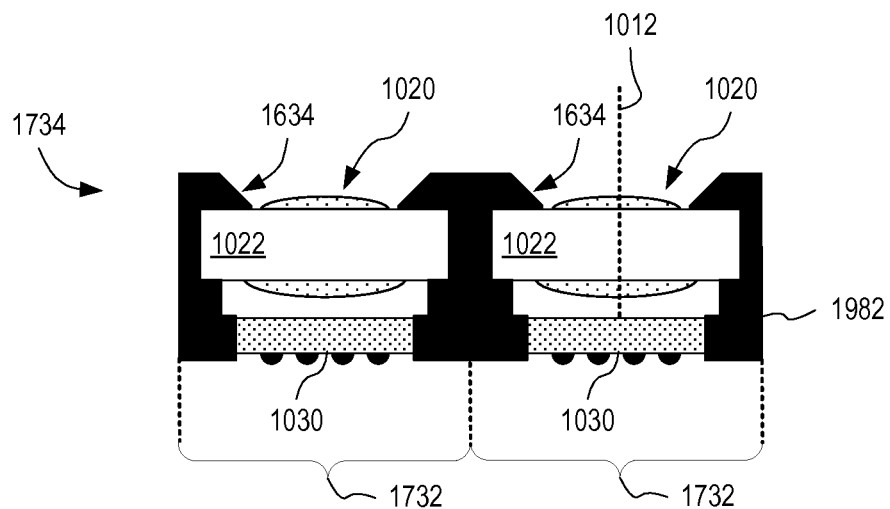
FIG. 19
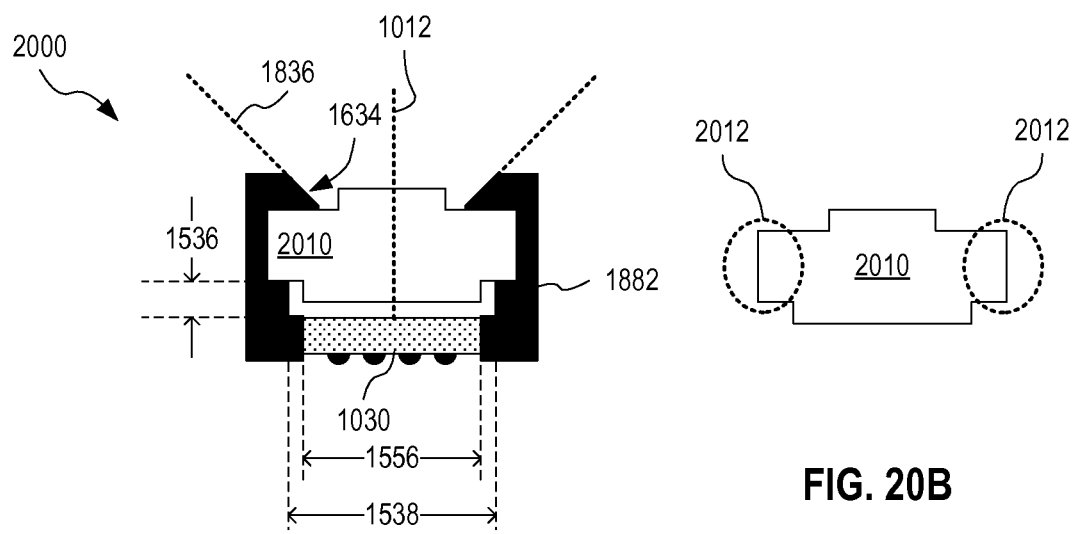
FIG. 20A
FIG. 20B

WAFER-LEVEL METHODS FOR PACKING CAMERA MODULES, AND ASSOCIATED CAMERA MODULES

RELATED APPLICATIONS

This application is a continuation in part of U.S. patent application Ser. No. 14/605,298, filed Jan. 26, 2015, which is incorporated herein by reference in its entirety.

BACKGROUND

Cameras are incorporated into a wide range of devices. For example, widely used consumer electronics devices, such as phones, tablets, and laptops, include a camera. To comply with the targeted cost for such devices, the camera must be manufactured at very low cost. The manufacturing cost of a typical camera module is composed of (a) cost of materials, such as cost of the image sensor, the lens material, and the packaging material, and (b) cost of packaging (including assembly). In many cases, the cost of packaging is significant and may even exceed the cost of materials. For example, both of image sensors and lenses may be inexpensively produced at the wafer-level, while the process of aligning the lens with the image sensor and the process of constructing a light-tight housing (apart from the viewing port) for the camera module are non-wafer-level processes that contribute to the total cost of a camera module in a non-negligible fashion.

Array cameras, such as stereo cameras, have significant market potential not only in consumer electronics but also in the automotive and machine vision industries. In an array camera, each lens must be aligned to its corresponding image sensor, and each individual camera of the array camera must be light-tight such that there is no interference from unwanted external light and such that there is no cross-talk between individual cameras. The process of packaging array cameras is therefore particularly costly.

SUMMARY

In an embodiment, a wafer-level method for packaging a plurality of camera modules includes overmolding a first housing material around a plurality of image sensors to produce a first wafer of packaged image sensors. The method further includes seating a plurality of lens units in the first wafer above the plurality of image sensors, respectively. Additionally, the method includes overmolding a second housing material over the first wafer and around the lens units to form a second wafer of packaged camera modules. Each of the packaged camera modules includes one of the image sensors and one of the lens units, and the second housing material cooperates with the first housing material to secure the lens units in the second wafer.

In an embodiment, a camera module includes an image sensor having a light-receiving surface and sides facing away from an optical axis of the camera module, and a lens unit for imaging a scene onto the image sensor. The lens unit includes a substrate. The camera module further includes a housing holding the image sensor and the lens unit, wherein the housing contacts the sides.

BRIEF DESCRIPTION OF THE DRAWINGS

FIG. 4 is a flowchart for the method of FIG. 1, according to an embodiment.
FIG. 11 illustrates a prior art die-level method for assembling and packaging a prior art camera module with a light tight housing.
FIG. 12 illustrates a scenario, wherein the respective form factors of an image sensor and a wafer-level lens are such that the prior art method of FIG. 11 cannot be used to assemble the image sensor with the wafer-level lens to form a camera module.
FIG. 13 illustrates another scenario, wherein the respective form factors of an image sensor and a wafer-level lens are such that the prior art method of FIG. 11 cannot be used to reliably assemble the image sensor with the wafer-level lens to form a camera module.
FIG. 19 shows an array camera module produced by the method of FIG. 14, according to an embodiment.
FIGS. 20A and 20B illustrate a camera module 2000, according to an embodiment.

DETAILED DESCRIPTION OF THE EMBODIMENTS

Disclosed herein are methods for packaging lenses, lens assemblies, and/or camera modules. These methods are at least partly wafer-level based, thus significantly reducing packaging cost as compared to non-wafer-level methods. FIGS. 1-9 are concerned with methods that package wafer-level lenses at the wafer-level to construct lens assemblies with an integrated housing. The housing may be light tight, apart from the viewing ports. These lens assemblies may subsequently be bonded to respective image sensors to form camera modules. FIGS. 10-20B are concerned with methods that package lens units with respective image sensors at the wafer-level to produce housings for the resulting camera modules. These methods eliminate the need for a step of bonding a lens unit to an image sensor, hereby further reducing packaging cost.

Figure 1:
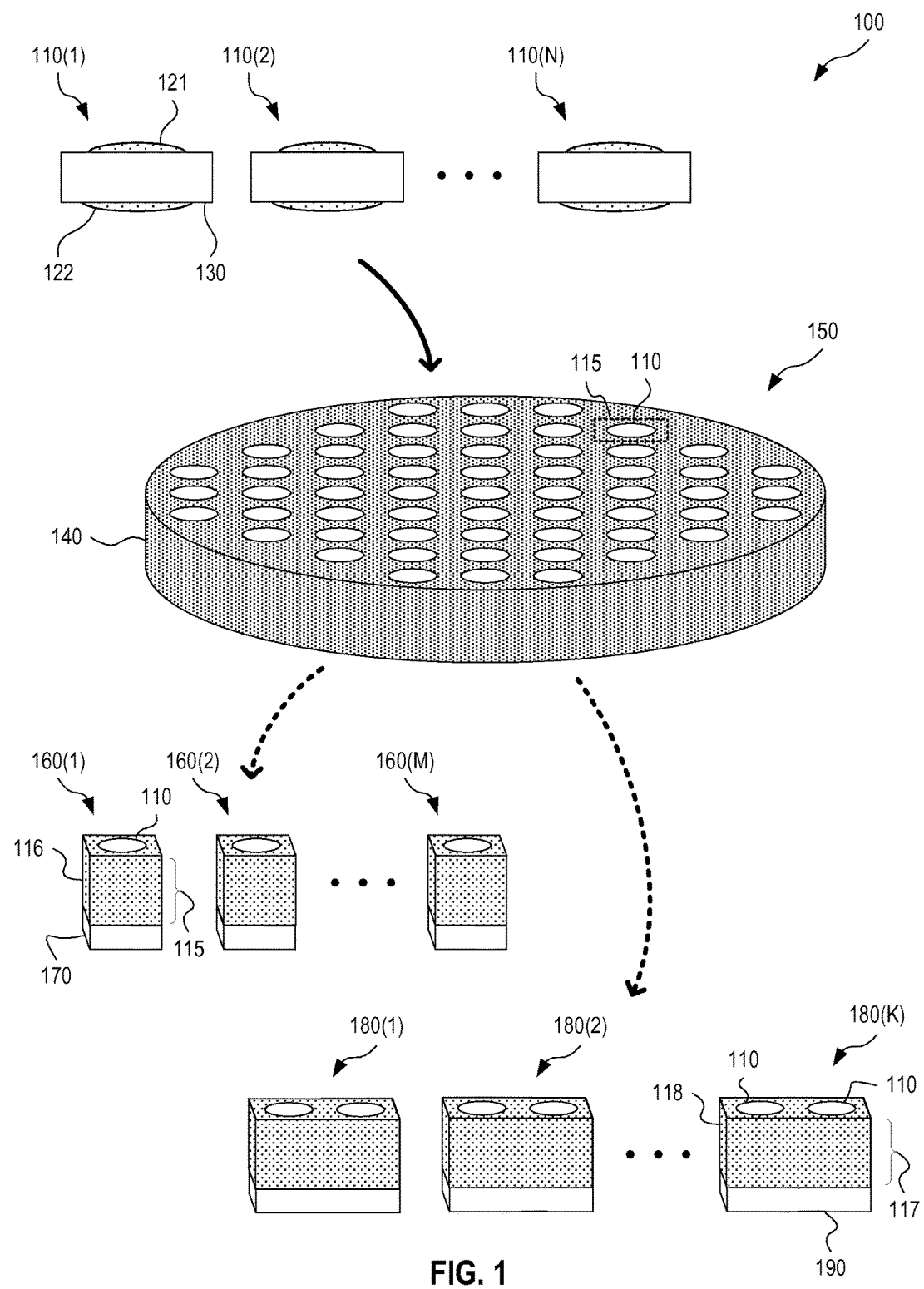
FIG. 1 illustrates a method for packaging a plurality of wafer-level lenses, according to an embodiment.

FIG. 1 illustrates one exemplary method 100 for packaging a plurality of wafer-level lenses 110. Each wafer-level lens 110 includes two lens elements 121 and 122 formed on two opposite facing surfaces of a substrate 130. Substrate 130 is at least partially transmissive to light in a wavelength range of interest. In method 100, the plurality of wafer-level lenses 110 are partially encased by housing material 140 to form a wafer 150 of packaged wafer-level lenses 115. Wafer 150 is integrally formed around the plurality of wafer-level lenses 110, such that housing material 140 forms a housing 116 for each of wafer-level lenses 110. Thus, wafer 150 may be diced to produce a plurality of packaged wafer-level lens 115, each composed of a wafer-level lens 110 and a housing 116 therefor.

Through production of wafer 150, method 100 facilitates simplified alignment of wafer-level lenses 110 with image sensors to form camera modules. In certain embodiments, housing material 140 is opaque. Herein, "opaque" refers to being substantially opaque to light of wavelength in a wavelength range of interest, such as the wavelength range to which an associated image sensor is sensitive. In such embodiments, the production of wafer 150 inherently provides light-tight housings for each wafer-level lens 110. Accordingly, method 100 facilitates simplified packaging of camera modules, as compared to prior art methods.

Method 100 allows for shaping housing material 140 of wafer 150 such that packaged wafer-level lens 115 may easily be assembled with an image sensor 170 to produce a camera module 160. Image sensor 170 captures an image formed thereon by wafer-level lens 110. In one implementation of method 100, housing material 140 of wafer 150 is shaped such that packaged wafer-level lens 115 may be mounted directly to image sensor 170 by bonding housing 116 onto image sensor 170. In one example, housing material 140 of wafer 150 is shaped such that housing 116 ensures proper alignment of packaged wafer-level lens 115 with respect to image sensor 170.

In one embodiment of method 100, wafer 150 is diced to singulate individual packaged wafer-level lenses 115. In this embodiment, method 100 may include mounting a plurality of individual packaged wafer-level lenses 115 to a respective plurality of image sensors 170 to form a plurality of camera modules 160.

In another embodiment, wafer 150 is diced to singulate arrays 117 of packaged wafer-level lenses 115, each array 117 having a housing 118 formed from housing material 140. In this embodiment, method 100 may include mounting a plurality of such arrays 117 to a respective plurality of image sensor arrays 190 to form a plurality of array camera modules 180. The number of image sensors within each image sensor array 190 matches the number of wafer-level lenses 110 within each array 117. In one implementation of this embodiment, housing material 140 of wafer 150 is shaped such that array 117 may be mounted directly to image sensor array 190 by bonding housing 118 onto image sensor array 190. In one example, housing material 140 of wafer 150 is shaped such that housing 118 ensures proper alignment of packaged wafer-level lens 115 with respect to image sensor array 190.

Without departing from the scope hereof, array 117 may include more than two wafer-level lenses 110, and array camera module 180 may include more than two individual cameras. Additionally, lens elements 121 and 122 may have shape different from those illustrated in FIG. 1, without departing from the scope hereof.

Figure 2:
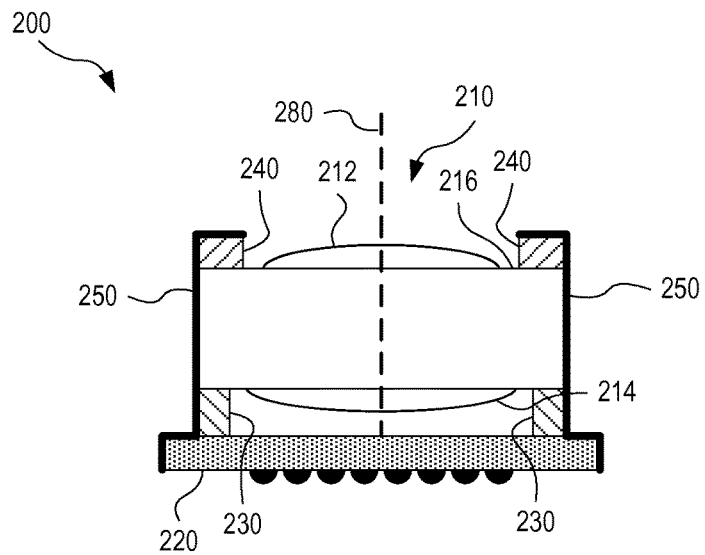
FIG. 2 illustrates a prior art camera module.

FIG. 2 illustrates a prior art camera module 200. Prior art camera module 200 includes an image sensor 220 and a wafer-level lens 210 composed of a substrate 216 and two lens elements 212 and 214. Prior art camera module 200 further includes a bottom spacer 230 for mounting wafer-level lens 210 onto image sensor 220 with a pre-specified spacing between wafer-level lens 210 and image sensor 220. Typically, the pre-specified spacing is a spacing required for wafer-level lens 210 and image sensor 200 to work together to serve a certain purpose, for example to function as a camera module. Additionally, prior art camera module 200 includes a top spacer 240 and a black coating 250. Black coating 250 blocks at least a portion of unwanted light propagating toward image sensor 220, i.e., light that is not properly imaged onto image sensor 220 by wafer-level lens 210. Top spacer 240 serves as a platform for depositing black coating 250 to block light propagating toward wafer-level lens 210 at angles, relative to optical axis 280 of wafer-level lens 210, greater than the desired angles.

Prior art camera module 200 is formed by (a) aligning wafer-level lens 210 (and bottom spacer 230 and top spacer 240) with respect to image sensor 220, (b) bonding bottom spacer 230, wafer-level lens 210, and top spacer 240 to image sensor 220, and (c) depositing black coating 250. The process of depositing black coating 250 includes either avoiding deposition of black coating 250 on lens element 212 or removing black coating 250 from lens element 212.

As will be discussed further below in reference to FIGS. 6-9, method 100 reduces the number of bonding steps required to form a camera module based upon a wafer-level lens, since equivalents of bottom spacer 230 and top spacer 240 are integrally formed by shaping housing material 140 to form wafer 150. In addition, since housing material 140 may be opaque, method 100 does not require a separate process step of depositing black coating 250. Furthermore, method 100 may shape housing material 140 such that the shape of housing 116 inherently ensures proper alignment of packaged wafer-level lens 115 with respect to image sensor 170.

Figure 3:
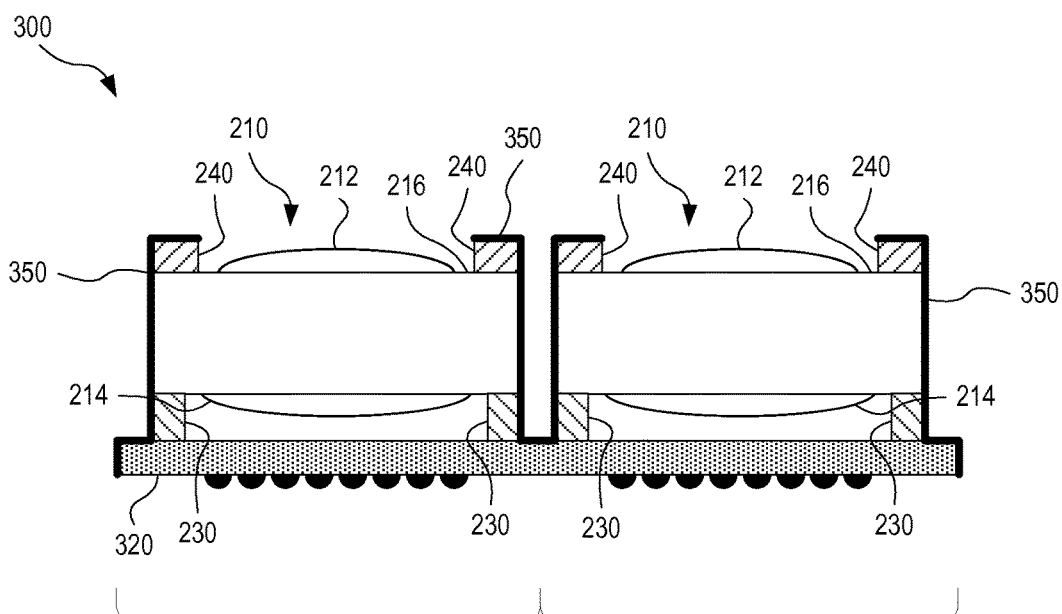
FIG. 3 illustrates a prior art array camera module.

FIG. 3 illustrates a prior art array camera module 300 with two individual cameras 302. Prior art array camera module 300 is an extension of prior art camera module 200 (FIG. 2) to an array camera. Prior art array camera module 300 includes two wafer-level lenses 210 mounted onto an image sensor array 320 using bottom spacers 230. Prior art array camera module 300 further includes top spacers 240 and a black coating 350. Top spacer 240 and black coating 350 serve the same purposes as discussed in reference to FIG. 2. Furthermore, black coating 350 optically isolates cameras 302 from each other. To optically isolate cameras 302 from each other, wafer-level lenses 210 are located a distance apart from each other, and black coating 350 is deposited in between wafer-level lenses 210.

Prior art array camera module 300 is formed by (a) aligning each of wafer-level lenses 210 (and bottom spacers 230 and top spacers 240) with respect to each image sensor of image sensor array 320, (b) bonding bottom spacers 230, wafer-level lenses 210, and top spacers 240 to image sensor array 320, and (c) depositing black coating 350. The process of depositing black coating 350 includes either avoiding deposition of black coating 350 on lens elements 212 or removing black coating 350 from lens elements 212.

As will be discussed further in reference to FIGS. 6-9 below, method 100 reduces the number of bonding steps required to form an array camera module based upon wafer-level lenses, since equivalents of bottom spacer 230 and top spacer 240 are integrally formed by shaping housing material 140 to form wafer 150. In addition, since housing material 140 may be opaque, method 100 does not require a separate process step of depositing black coating 350. Furthermore, method 100 may shape housing material 140 such that the shape of housing 118 inherently ensures proper alignment of array 117 with respect to image sensor array 190.

FIG. 4 is a flowchart 400 for method 100 (FIG. 1). In a step 410, method 400 forms wafer 150 of packaged wafer-level lenses 115. Step 410 includes partially encasing a plurality of wafer-level lenses 110 in housing material 140 such that housing material 140 forms a housing 116 for each of the plurality of wafer-level lenses 110. In certain embodiments, housing material 140 is opaque such that housings 116, formed in step 410, are opaque. Step 410 includes a step 412 of shaping housing material 140 such that it supports wafer-level lenses 110 by contacting, for each wafer-level lens 110, substrate 130. Furthermore, step 412 shapes housing material 140 such that each housing 116 has openings for allowing light propagation through the plurality of wafer-level lenses 110.

In an optional step 420, wafer 150 is diced to form a plurality of wafer-level lens assemblies. In one embodiment, each of the plurality of wafer-level lens assemblies is a packaged wafer-level lens 115. In this embodiment, step 420 includes a step 422 of dicing wafer 150 to produce a plurality of packaged wafer-level lenses 115. In another embodiment, each of the plurality of wafer-level lens assemblies is an array 117. In this embodiment, step 420 includes a step 424 of dicing wafer 150 to produce a plurality of arrays 117. In yet another embodiment, the plurality of wafer-level lens assemblies includes both packaged wafer-level lenses 115 and arrays 117. In this embodiment, step 420 applies steps 422 and 424 to mutually different portions of wafer 150. One or both of the mutually different portions may be non-contiguous.

Optionally, method 400 includes a step 430 of bonding at least one of the wafer-level lens assemblies, produced in step 420, to an image sensor module to form a camera module. In embodiments of method 400 that include step 422, the module of step 430 may be image sensor 170 and step 430 may include a step 432. In step 432, at least one packaged wafer-level lens 115 is bonded to image sensor 170 to form at least one respective camera module 160. In embodiments of method 400 that include step 424, the module of step 430 may be image sensor array 190 and step 430 may include a step 434. In step 434, at least one array 117 is bonded to image sensor array 190 to form at least one respective array camera module 180.

Figure 5:
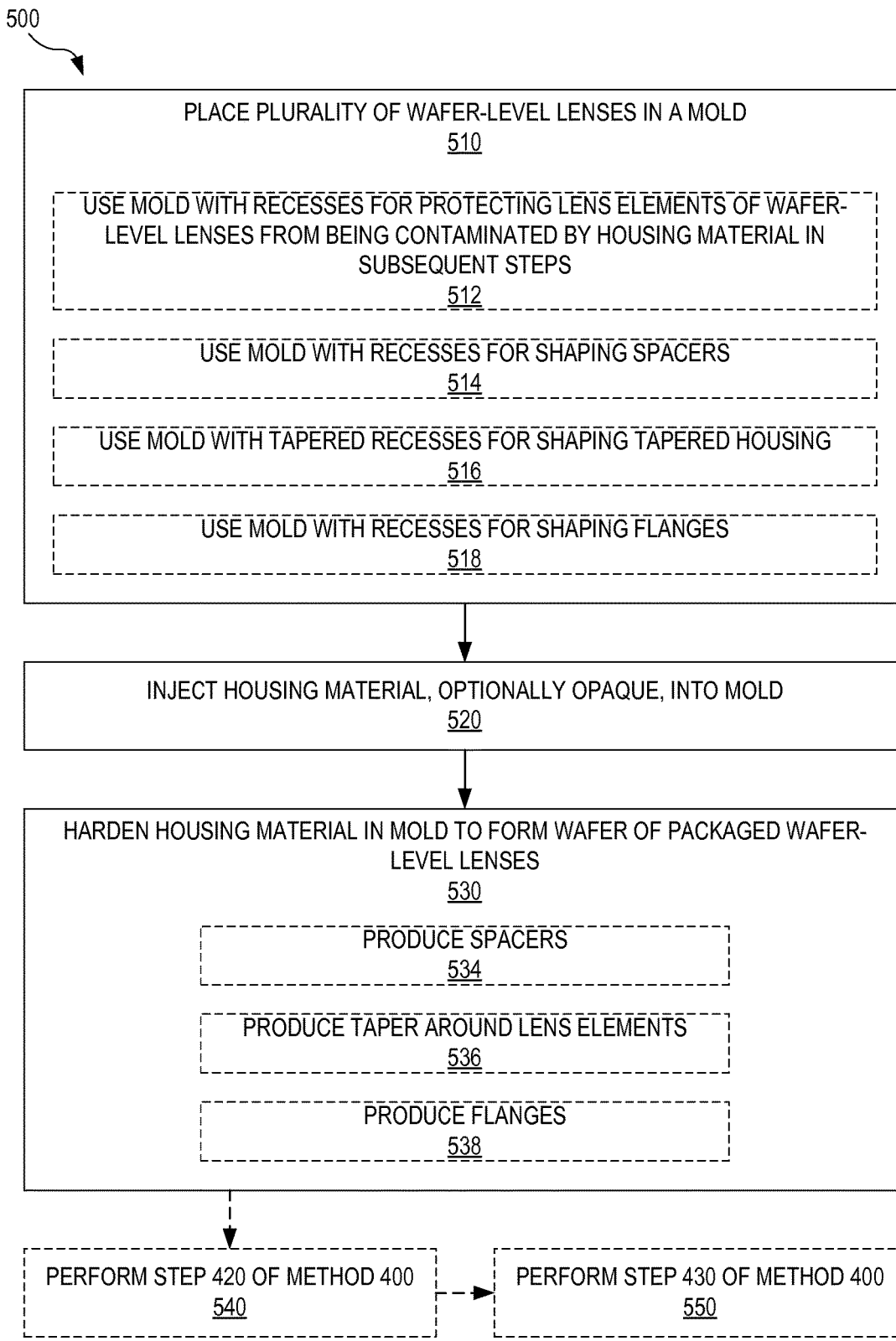
FIG. 5 is a flowchart for another method for packaging a plurality of wafer-level lenses, according to an embodiment.

FIG. 5 is a flowchart illustrating one exemplary injection-molding method 500 for packaging a plurality of wafer-level lenses 110 (FIG. 1). Method 500 is an embodiment of method 400 (FIG. 4).

Figure 6:
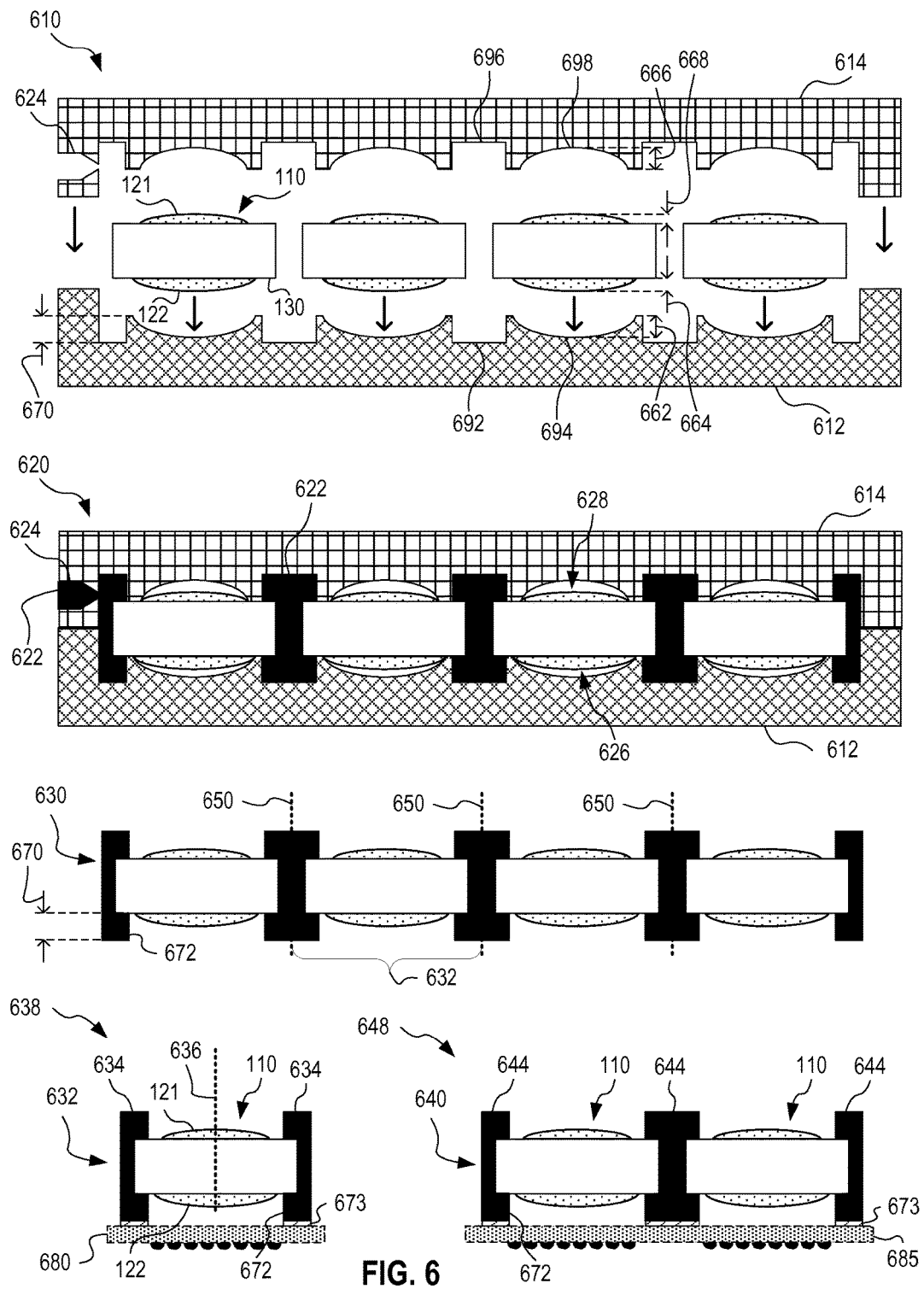
FIG. 6 schematically illustrates certain steps of the method of FIG. 5, as well as wafer-level lens assemblies and camera modules produced therefrom, according to one embodiment.

FIG. 6 schematically illustrates one example of method 500 together with one exemplary wafer 630 of packaged wafer-level lenses produced according to this example of method 500. FIG. 6 further illustrates exemplary wafer-level lens assemblies (packaged wafer-level lens 632 and packaged lens array 640), and camera modules (camera module 638 and array camera module 648) associated with this example of method 500. FIGS. 5 and 6 are best viewed together.

In a step 510, a plurality of wafer-level lenses 110 are placed in a mold. Diagram 610 illustrates one example of step 510. In diagram 610, a plurality of wafer-level lenses 110 are placed in a lower mold piece 612, for example using pick and place technology as known in the art. For clarity of illustration, not all wafer-level lenses 110, not all lens elements 121 and 122, and not all substrates 130 are labeled in FIG. 6. Next, an upper mold piece 614 is closed down on lower mold piece 612. Diagram 620 shows the resulting configuration. Together, lower mold piece 612 and upper mold piece 614 include at least one injection gate 624. Although FIG. 6 shows upper mold piece with a single injection gate 624, and lower mold piece with no injection gate, the actual number of injection gates as well as placement of the injection gate(s) may differ from that shown in FIG. 6 without departing from the scope hereof. Lower mold piece 612 includes recesses 692 for shaping the housing material subsequently injected into the mold composed of lower mold piece 612 and upper mold piece 614. Likewise, upper mold piece 614 includes recesses 696 for shaping the housing material. For clarity of illustration, not all recesses 692 and 696 are labeled in FIG. 6.

Although FIG. 6 shows four wafer-level lenses 110 being placed in lower mold piece 612, lower mold piece 612 and upper mold piece 614 may be configured to accept any number of wafer-level lenses 110. For example, lower mold piece 612 and upper mold piece 614 may be configured to accept tens, hundreds, or thousands of wafer-level lenses 110 to produce wafer 630 with tens, hundreds, or thousands of wafer-level lenses 110.

In an embodiment, step 510 includes a step 512 of using a mold with recesses for protecting lens elements 121 and 122 of each of wafer-level lenses 110 from being contaminated by housing material 140 in subsequent steps of method 500. Diagrams 610 and 620 illustrate one example of step 512. Lower mold piece 612 includes recesses 694 having depth 662. Depth 662 is measured relative to substrate 130 when wafer-level lenses 110 are placed in lower mold piece 612. Depth 662 exceeds the extent 664 of lens element 122 away from substrate 130, such that there is a gap 626 between each recess 694 and associated lens element 122. Lower mold piece 612 contacts substrate 130 along a path that circumnavigates lens element 122 to prevent housing material from entering gap 626. Similarly, upper mold piece 614 includes recesses 698 having depth 666. Depth 666 is measured relative to substrate 130 when upper mold piece 614 is closed down on lower mold piece 612. Depth 666 exceeds the extent 668 of lens element 121 away from substrate 130, such that there is a gap 628 between each recess 698 and associated lens element 121. Upper mold piece 614 contacts substrate 130 along a path that circumnavigates lens element 121 to prevent housing material from entering gap 628. For clarity of illustration, not all recesses 694 and not all recesses 698 are labeled in FIG. 6.

In a step 520, housing material 140 is injected into the mold. Diagram 620 illustrates one example of step 520, wherein an opaque housing material 622 is injected into the mold, consisting of lower mold piece 612 and upper mold piece 614, through injection gate 624 to at least substantially fill recesses 692 and 696.

In a step 530, housing material 140 is hardened in the mold to form wafer 150. Wafer 630 of packaged wafer-level lenses 632 is one exemplary outcome of step 530 based upon the exemplary mold consisting of lower mold piece 612 and upper mold piece 614. Wafer 630 is an embodiment of wafer 150. Each packaged wafer-level lens 632 is an embodiment of packaged wafer-level lens 115 and includes wafer-level lens 110 and some of hardened opaque housing material 622.

Optionally, method 500 includes a step 540 of performing step 420 of method 400 to form a plurality of packaged wafer-level lens assemblies. FIG. 6 illustrates one exemplary packaged wafer-level lens 632 formed in step 540 by dicing wafer 630 along dicing lines 650 according to step 422. FIG. 6 also illustrates one exemplary packaged lens array 640 formed in step 540 by dicing wafer 630 along a true subset of dicing lines 650 according to step 424. Packaged lens array 640 includes two wafer-level lenses 110. Although lower mold piece 612 and upper mold piece 614 are shown in FIG. 6 as producing a wafer 630 that does not requiring dicing at locations along the perimeter thereof, lower mold piece 612 and upper mold piece 614 may be configured to produce wafer 630 with excess material along the perimeter. In this case, dicing lines 650 are included also along the perimeter of wafer 630.

Method 500 may further include a step 550 of performing step 430 of method 400 to form at least one camera module. FIG. 6 illustrates exemplary outcomes of step 550. In one example, packaged wafer-level lens 632 is bonded to an image sensor 680 to form a camera module 638. Image sensor 680 is an embodiment of image sensor 170. Camera module 638 is an embodiment of camera module 160. In another example, packaged lens array 640 is bonded to an image sensor array 685 to form an array camera module 648. Image sensor array 685 is an embodiment of image sensor array 190 and includes two image sensors. Array camera module 648 is an embodiment of array camera module 180.

Packaged wafer-level lens 632 includes wafer-level lens 110 and an opaque housing 634 formed from opaque housing material 622. Opaque housing 634 is an embodiment of housing 116. Opaque housing 634 contacts substrate 130 and surrounds wafer-level lens 110 in a radial direction (orthogonal to optical axis 636 of wafer-level lens 110). Opaque housing 634 thereby forms a light-tight enclosure with openings that allow light propagation through wafer-level lens 110. Opaque housing 634 covers the portion of substrate 130 that faces away from optical axis 636. Opaque housing 634 extends inwards from the perimeter of substrate 130 towards optical axis 636 along both (a) the surface of substrate 130, which holds lens element 121 and (b) the surface of substrate 130, which holds lens element 122. Packaged wafer-level lens 632 may be bonded to image sensor 680 in step 550 by bonding opaque housing 634 to image sensor 680.

Optionally, a layer 673 is located between opaque housing 634 and image sensor 680. In one implementation, layer 673 is an adhesive. The adhesive may include an epoxy, a double-sided adhesive tape, a transfer adhesive tape, or another adhesive known in the art. In another implementation, layer 673 includes an adhesive, such as those mentioned above, and an additional spacer.

As compared to prior art camera module 200 (FIG. 2), opaque housing 634 of packaged wafer-level lens 632 integrally forms equivalents of bottom spacer 230, top spacer 240, and black coating 250.

Packaged lens array 640 includes two wafer-level lenses 110 and an opaque housing 644 formed from opaque housing material 622. Opaque housing 644 is an embodiment of housing 118. Opaque housing 644 contacts each substrate 130 and surrounds each wafer-level lens 110 in a radial direction (orthogonal to optical axis 636). Opaque housing 644 thereby forms a light-tight enclosure with openings that allow light propagation through each wafer-level lens 110. Opaque housing 644 covers, for each wafer-level lens 110, the portion of substrate 130 that faces away from the associated optical axis 636. For each wafer-level lens 110, opaque housing 644 extends inwards from the perimeter of substrate 130 towards optical axis 636 along both (a) the surface that holds lens element 121 and (b) the surface that holds lens element 122. Packaged lens array 640 may be bonded to image sensor array 685 in step 550 by bonding opaque housing 644 to image sensor array 685, thus forming an embodiment of array camera module 180. Optionally, layer 673 is located between at least portions of opaque housing 644 and image sensor array 685. In one implementation, layer 673 is an adhesive, as discussed above, and is located between opaque housing 644 and image sensor array 685 along a peripheral path that surrounds image sensor array 685.

Without departing from the scope hereof, packaged lens array 640 may include more than two wafer-level lenses 110, for example four wafer-level lenses 110 arranged in a 2×2 array or three wafer-level lenses 110 arranged in a 1×3 array. Related hereto, image sensor array 685 is configured to match each wafer-level lens 110 of packaged lens array 640 with an image sensor.

As compared to prior art array camera module 300 (FIG. 3), opaque housing 644 integrally forms equivalents of bottom spacers 230, top spacers 240, and black coating 350. In addition, both of wafer-level lenses 110 are aligned in a single step, whereas the two wafer-level lenses 210 of prior art array camera module 300 are aligned separately. Hence, the alignment process and assembly process of method 500 is greatly simplified as compared to the prior art.

In an embodiment, step 510 includes a step 514 of using a mold with recesses for shaping spacers according to a pre-specified spacing between wafer-level lenses 110 and associated image sensors. In this embodiment, step 530 includes a step 534 of producing wafer 150 with the spacers. Diagram 610 and wafer 630 illustrate one example of this embodiment. Recesses 692 have depth 670. Depth 670 is measured relative to substrate 130 when wafer-level lenses 110 are placed in lower mold piece 612. Accordingly, wafer 630 includes spacers 672 having extent 670 in a direction along optical axis 636 away from substrate 130 on the side of substrate 130 associated with lens element 122. In one implementation, extent 670 matches a pre-specified spacing between packaged wafer-level lens 632 and image sensor 680 (or a pre-specified spacing between packaged lens array 640 and image sensor array 685) apart from any adhesive placed therebetween.

In an embodiment, step 510 includes a step 516 of using a mold with tapered recesses for shaping a tapered housing for each wafer-level lenses 110. In this embodiment, step 530 includes a step 536 of producing wafer 150 with a taper around each wafer-level lens 110.

Figure 7:
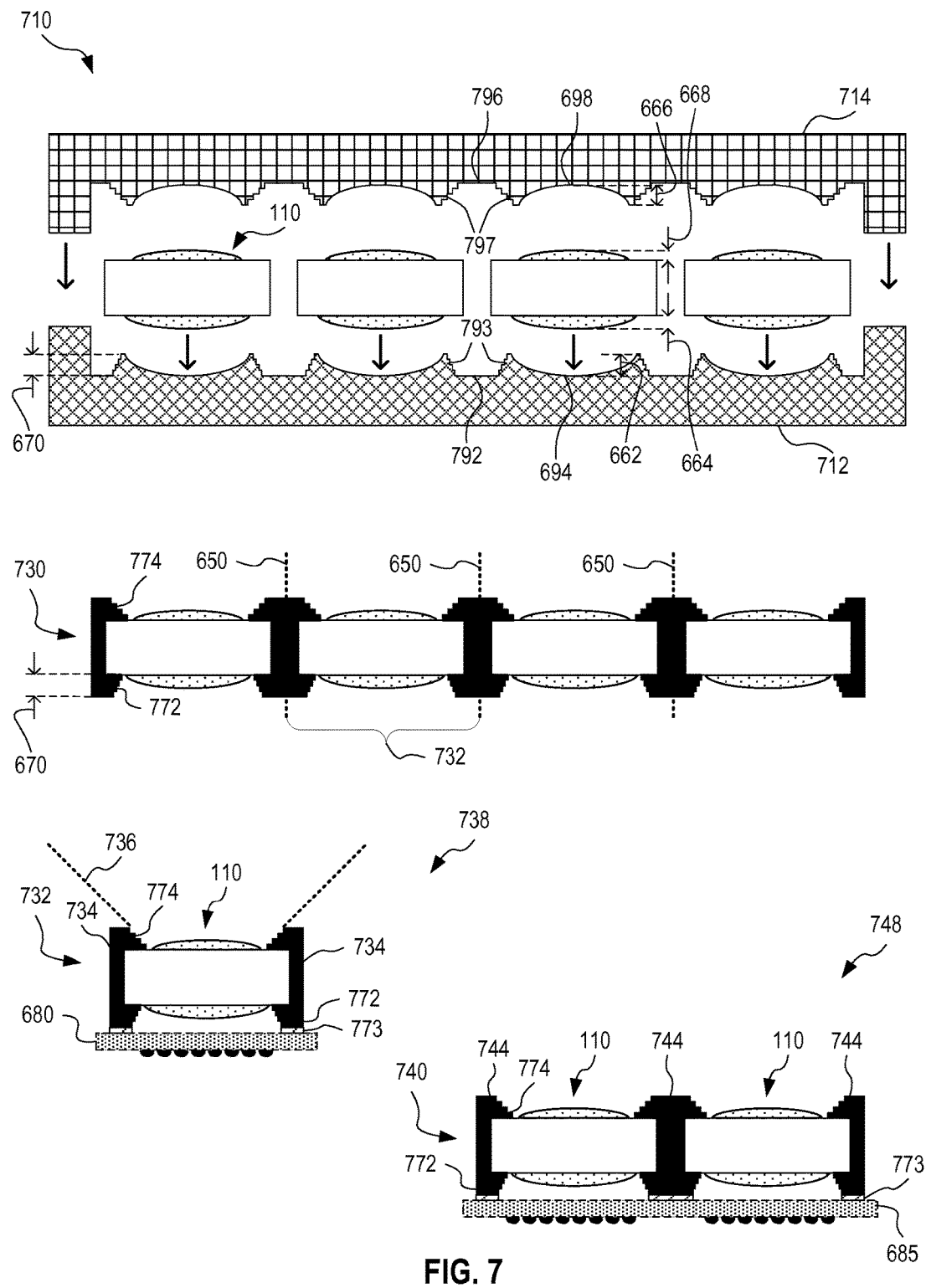
FIG. 7 schematically illustrates certain steps of the method of FIG. 5, as well as wafer-level lens assemblies and camera modules produced therefrom, according to another embodiment.

FIG. 7 schematically illustrates one example of method 500 (FIG. 5) when implemented with steps 516 and 536. FIG. 7 also shows one exemplary wafer 730 of packaged wafer-level lenses produced according to this example of method 500. Additionally, FIG. 7 shows exemplary wafer-level lens assemblies (packaged wafer-level lens 732 and packaged lens array 740), and camera modules (camera module 738 and array camera module 748) associated with this example of method 500. The embodiment of method 500 that includes steps 516 and 536 is best viewed together with FIG. 7.

Diagram 710 illustrates one example of step 516 based upon a lower mold piece 712 and an upper mold piece 714. Lower mold piece 712 is similar to lower mold piece 612, except that recesses 692 are replaced by recesses 792. Upper mold piece 714 is similar to upper mold piece 614, except that recesses 696 are replaced by recesses 796. Recesses 792 have a taper 793, and recesses 796 have a taper 797. Tapers 793 and 797 may be stepwise tapers, as shown in FIG. 7, or smooth tapers, without departing from the scope hereof.

Wafer 730 is one exemplary outcome of step 530 implemented with step 536 when using lower mold piece 712 and upper mold piece 714 in step 510. Tapers 793 produce a tapered spacer 772 around each wafer-level lens 110 on side of wafer-level lens 110 associated with lens element 122. As compared to wafer 630 (FIG. 6), spacers 672 are replaced by tapered spacers 772 shaped by tapers 793. Tapers 797 produce a taper 774 around each wafer-level lens 110 on the light-receiving side of wafer-level lens 110, i.e., the side associated with lens element 121. Taper 774 provides optimal acceptance of light propagating toward wafer-level lens 110 from within a field of view (indicated by field of view angle 736), while also providing optimal blocking of light propagating toward wafer-level lens 110 from outside this field of view. Tapers 797 may have any angle matching a pre-specified field of view angle 736.

Wafer 730 may be used in optional step 540 to produce a plurality of packaged wafer-level lenses 732 and/or a plurality of packaged lens arrays 740. Packaged wafer-level lens 732 is similar to packaged wafer-level lens 632 except for opaque housing 634 being replaced by opaque housing 734 having tapered spacer 772 and taper 774. Packaged lens array 740 is similar to packaged lens array 640 except for opaque housing 644 being replaced by housing 744. Housing 744 is similar to opaque housing 644 except for having tapered spacers 772 and tapers 774.

In optional step 550, at least one packaged wafer-level lens 732 is bonded to image sensor 680, as discussed in reference to FIG. 6, to form a camera module 738, and/or at least one packaged lens array 740 is bonded to image sensor array 685, as discussed in reference to FIG. 6, to form an array camera module 748. Camera module 738 is an embodiment of camera module 160, and array camera module 748 is an embodiment of array camera module 180.

In an embodiment, step 510 includes a step 518 of using a mold with recesses for shaping flanges. In this embodiment, step 530 includes a step 538 of producing wafer 150 with flanges. These flanges define the alignment of packaged wafer-level lenses 115 to image sensor 170, and/or define the alignment of array 117 with image sensor array 190.

Figure 8:
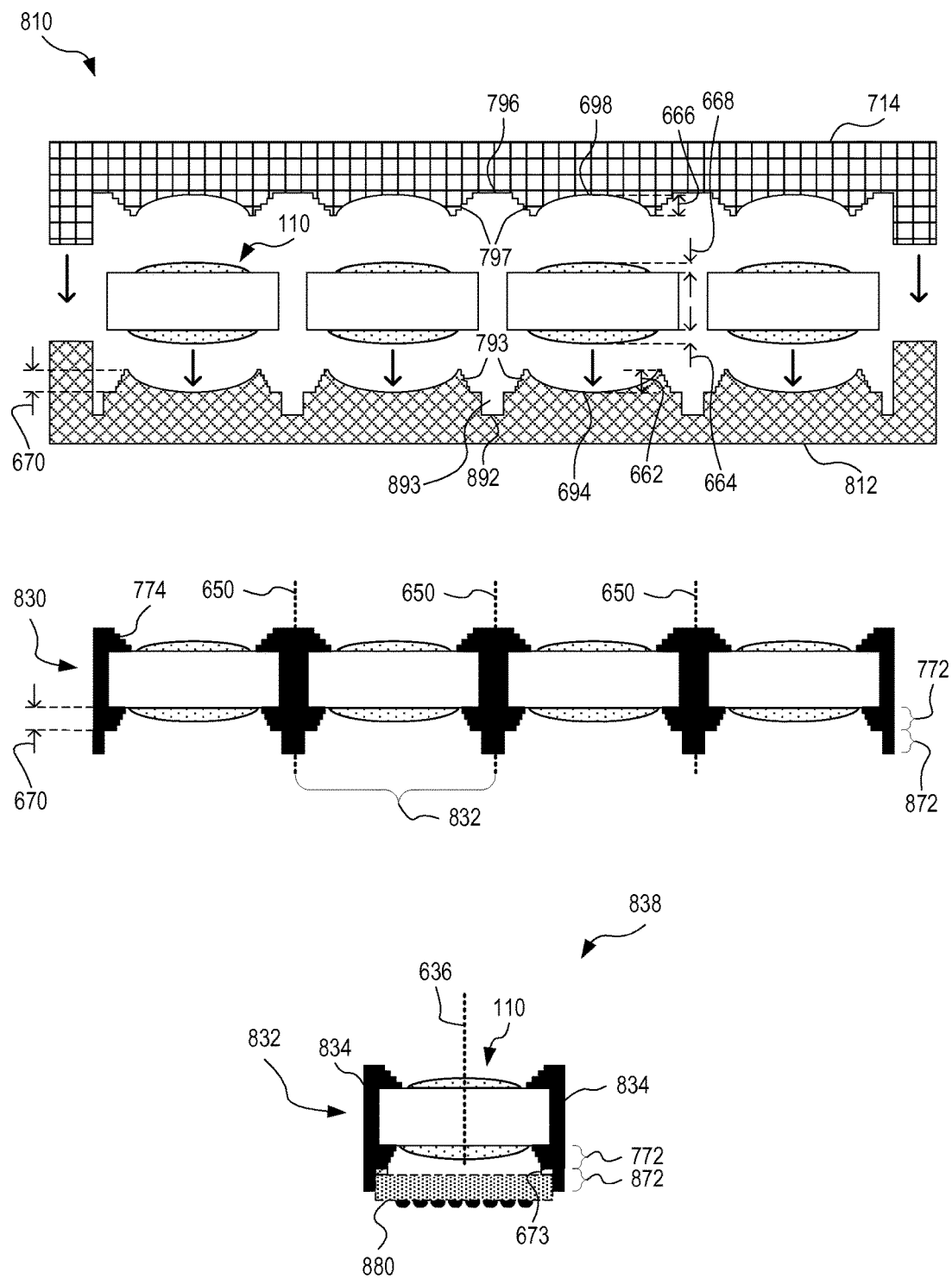
FIG. 8 schematically illustrates certain steps of the method of FIG. 5, as well as packaged wafer-level lenses and single-camera camera modules produced therefrom, according to yet another embodiment.

FIG. 8 illustrates one example of method 500 (FIG. 5), when implemented with steps 518 and 538, together with one exemplary wafer 830 of packed wafer-level lenses. FIG. 8 further shows one exemplary packaged wafer-level lens 832 and one exemplary camera module 838 produced by the example of method 500. The example illustrated in FIG. 8 is thus associated with an embodiment of method 500, which implements steps 518 and 538 and is tailored for production of (a) packaged wafer-level lenses having a single wafer-level lens, and (b) camera modules having a single camera. This embodiment of method 500 is best viewed together with FIG. 8.

Diagram 810 illustrates one example of step 518 based upon a lower mold piece 812 and upper mold piece 714 (FIG. 7). Lower mold piece 812 is similar to lower mold piece 712, except that recesses 792 are replaced by recesses 892. Recesses 892 have taper 793 and an additional inner recess 893 with depth greater than depth 670.

FIG. 8 shows one exemplary wafer 830 of packaged wafer-level lenses 832. Wafer 830 is one exemplary outcome of step 530 implemented with step 538 when using lower mold piece 812 in step 510 implemented with step 518. As compared to wafer 730 (FIG. 7), an additional flange 872 exists on tapered spacer 772. Thus, each wafer-level lens in wafer 830 is surrounded, on the side associated with lens element 122, by tapered spacer 772 and flange 872.

Wafer 830 may be used in optional step 540, implemented with step 422 (FIG. 4), to produce a plurality of packaged wafer-level lenses 832. Packaged wafer-level lens 832 is similar to packaged wafer-level lens 732 except for opaque housing 734 being replaced by opaque housing 834. Opaque housing 834 is similar to opaque housing 734 except for also including flange 872.

In optional step 550, implemented with step 432, at least one packaged wafer-level lens 832 is bonded to an image sensor 880 to form an embodiment of camera module 160. Flange 872 contacts, or nearly contacts, the sides of image sensor 880 to define the alignment of packaged wafer-level lens 832 with respect to image sensor 880. Tapered spacer 772 defines the spacing between image sensor 880 and wafer-level lens 110 (apart from optional layer 673), while flange 872 defines the positioning of wafer-level lens 110 in dimensions orthogonal to optical axis 636. Accordingly, flange 872 eliminates an active alignment step required when assembling prior art camera module 200 (FIG. 2).

Figure 9:
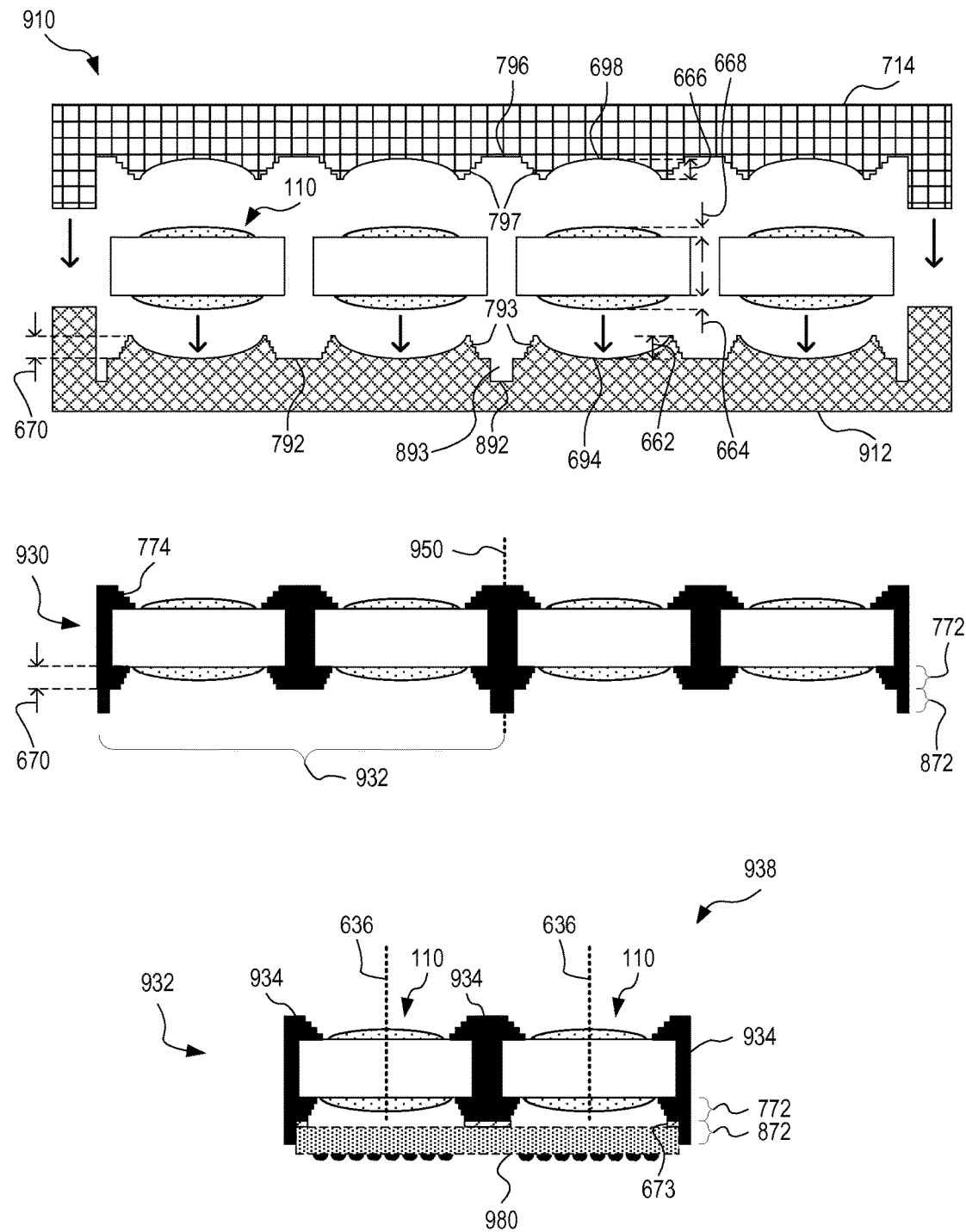
FIG. 9 schematically illustrates certain steps of the method of FIG. 5, as well as packaged lens arrays and array camera modules produced therefrom, according to a further embodiment.

FIG. 9 illustrates another example of method 500 (FIG. 5), when implemented with steps 518 and 538, together with one exemplary wafer 930 of packed wafer-level lenses. FIG. 9 further shows one exemplary packaged lens array 932 and one exemplary array camera module 938 produced by this example of method 500. The example illustrated in FIG. 9 is thus associated with an embodiment of method 500, which implements steps 518 and 538 and is tailored for production of packaged lens arrays and array camera modules. This embodiment of method 500 is best viewed together with FIG. 9.

Diagram 910 illustrates one example of step 518 based upon a lower mold piece 912 and upper mold piece 714 (FIG. 7). Lower mold piece 912 combines the properties of lower mold piece 712 and lower mold piece 812 to include both recesses 792 and recesses 892.

FIG. 9 shows one exemplary wafer 930 of packaged lens arrays 932. Wafer 930 is one exemplary outcome of step 530 implemented with step 538 when using lower mold piece 912 in step 510. As compared to wafer 830 (FIG. 7), the additional flange 872 exists on tapered spacer 772 in some locations, while other locations have tapered spacer 772 without flange 872.

Wafer 930 may be used in optional step 540, implemented with step 424 (FIG. 4), to produce a plurality of packaged lens arrays 932. In optional step 540, wafer 930 is diced along dicing lines 950 that coincide with locations having flanges 872, such that each packaged lens array 932 has flange 872 along its perimeter.

In optional step 550, implemented with step 434, at least one packaged lens array 932 is bonded to an image sensor array 980 to form an embodiment of array camera module 180. Flange 872 contacts, or nearly contacts, the sides of image sensor array 980 to define the alignment of packaged lens array 932 with respect to image sensor array 980. Tapered spacer 772 defines the spacing between image sensor 880 and wafer-level lens 110 (apart from optional layer 673), and provides light-blockage between individual cameras of the array camera module formed by packaged lens array 932 and image sensor array 980. Flange 872 defines the positioning of wafer-level lenses 110 in dimensions orthogonal to optical axis 636. Accordingly, flange 872 eliminates an active alignment step required when assembling prior art camera module 200 (FIG. 2).

In the example shown in FIG. 9, recesses 892 and dicing lines 950 are arranged to produce a plurality of packaged lens array 932 each having two wafer-level lenses 110. However, recesses 892 and dicing lines 950 may be arranged such that step 540 produces a plurality of packaged lens array 932, at least some of which each having more than two wafer-level lenses 110, without departing from the scope hereof. Furthermore, recesses 892 and dicing lines 950 may be arranged such that step 540 produces a combination of wafer-level lens assemblies including at least one packaged wafer-level lens 832 and at least one packaged lens array 932. It is understood that such wafer-level lens assemblies may be bonded, in step 550, to image sensor modules with the corresponding number and configuration of image sensors.

Without departing from the scope hereof, method 500 may be performed to produce a wafer of packaged wafer-level lenses that combines features of wafers 630, 730, 830, and 930. In one example, step 510 produces a wafer that may be diced in step 540 to produce at least two different wafer-level lens assemblies selected from the group consisting of packaged wafer-level lens 632, packaged lens array 640, packaged wafer-level lens 732, packaged lens array 740, packaged wafer-level lens 832, and packaged lens array 932. In another example, step 510 produces a wafer that may be diced in step 540 to produce one or more wafer-level lens assemblies, each combining features of packaged wafer-level lens 632, packaged lens array 640, packaged wafer-level lens 732, packaged lens array 740, packaged wafer-level lens 832, and packaged lens array 932. For example, non-tapered spacers may be combined with flanges, and/or non-tapered spacers may be combined with tapered spacers.

Figure 10:
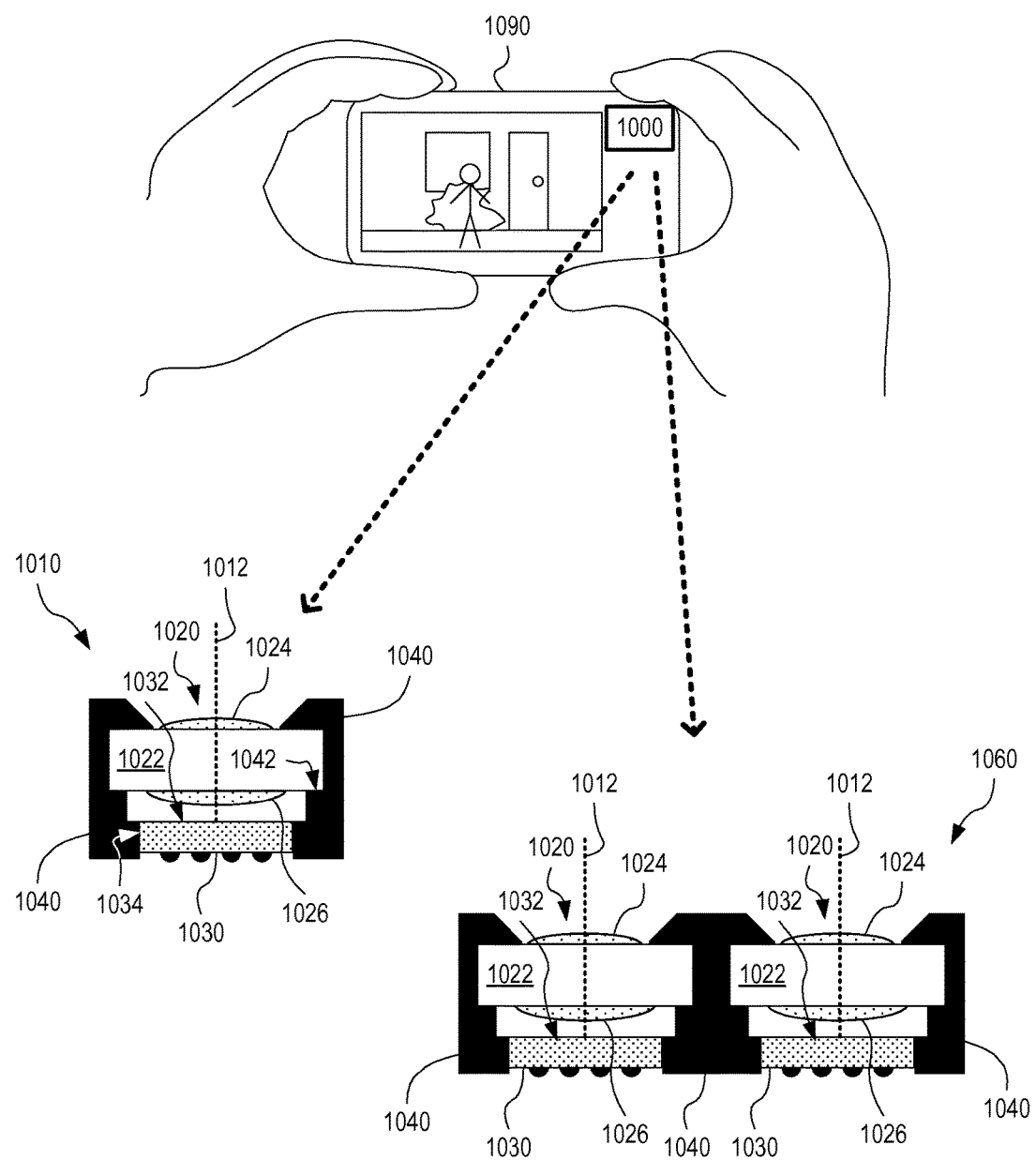
FIG. 10 illustrates a wafer-level packaged camera module, according to an embodiment.

FIG. 10 illustrates one exemplary wafer-level packaged camera module 1000. Camera module 1000 includes at least one lens unit 1020, at least one respective image sensor 1030, and a housing 1040. Image sensor 1030 is configured to capture an image formed by lens unit 1020. Housing 1040 performs multiple functions: (a) supporting lens unit(s) 1020 and image sensor(s) 1030, (b) holding lens unit(s) 1020 and image sensor(s) 1030 in their proper relative positions, and (c) forming a partial enclosure for lens unit(s) 1020 and image sensor(s) 1030. In certain embodiments, housing 1040 is made of an opaque material such that housing 1040 forms a light tight enclosure that prevents light from leaking into camera module 1040, to be detected by image sensor 1030, through other paths than through an intended viewing port.

Housing 1040 is formed at the wafer-level for a plurality of pairs of lens unit 1020 and image sensor 1030. As compared to conventional camera modules packaged at the die level, i.e., individually packaged, wafer-level packaged camera module 1000 is associated with lower packaging cost. Hence, camera module 1000 is well-suited for implementation in camera devices 1090 associated with strict cost constraints such as consumer electronic devices. In addition, housing 1040 may be tailored to form an enclosure for lens unit(s) 1020 and image sensor(s) 1030 having a variety of form factors. For example, housing 1040 may be tailored to form an enclosure for a lens unit 1020 and an image sensor 1030, wherein image sensor 1030 has significantly smaller transverse extent than lens unit 1020. Herein, "transverse" refers to the dimensions orthogonal to the optical axis 1012 of image sensor 1030.

FIG. 10 depicts lens unit 1020 as a wafer-level lens having a substrate 1022, a lens element 1026 on the side of substrate 1022 facing the light-receiving surface 1032 of image sensor 1030, and a lens element 1024 on the side of substrate 1022 facing away from light-receiving surface 1032. Without departing from the scope hereof, lens unit 1020 may be different from that shown in FIG. 10. For example, lens unit 1020 may be (a) a stacked wafer-level lens assembly having two of more substrates 1022 each with associated lens elements 1024 and 1026, (b) a die lens, or (c) a variable focal length lens assembly.

In one embodiment, wafer-level packaged camera module 1000 is a camera module 1010 that includes one image sensor 1030, one lens unit 1020, and associated housing 1040. In camera module 1010, housing 1040 forms a partial enclosure for one lens unit 1020 and one image sensor 1030. This enclosure circumnavigates optical axis 1012. In embodiments of camera module 1010, wherein housing 1040 is opaque, housing 1040 forms a light tight enclosure around light-receiving surface 1032 and lens unit 1012, apart from a viewing port for lens unit 1020 facing away from image sensor 1030. This light tight enclosure blocks at least a portion of unwanted light propagating toward image sensor 1030, i.e., light that is not properly imaged onto image sensor 1030 by lens unit 1020.

In another embodiment, wafer-level packaged camera module 1000 is an array camera module 1060 including two lens units 1020, two image sensors 1030 configured to capture images formed by lens units 1020, respectively, and housing 1040. In array camera module 1060, housing 1040 circumnavigates optical axis 1012 of each image sensor 1030. In embodiments of array camera module 1060, wherein housing 1040 is opaque, housing 1040 forms a light tight enclosure around each light-receiving surface 1032 and associated lens unit 1012, apart from a viewing port for each lens unit 1020 facing away from the corresponding image sensor 1030. This light tight enclosure blocks at least a portion of unwanted light propagating toward image sensors 1030, i.e., light that is not properly imaged onto image sensors 1030 by corresponding lens units 1020. The light-tight enclosure not only prevents light from leaking into array camera module 1060 from outside array camera module 1060, but also prevents light from leaking between individual camera modules of array camera module 1060.

In yet another embodiment, wafer-level packaged camera module 1000 is an array camera module similar to array camera module 1060 but having more than two individual camera modules, each including an image sensor 1030 and a lens unit 1020. For example, such an array camera module may be configured as a 2×2 array camera module with two adjacent non-collinear rows each having two camera modules, or a 1×3 array camera having three camera modules arranged on a line.

FIG. 11 illustrates a prior art die-level method 1100 for assembling and packaging a prior art camera module 1150 with a light tight housing. In a step 1102, glue 1112 is deposited around the perimeter of an image sensor 1130. In a step 1104, a wafer-level lens 1120 is aligned with image sensor 1130 and deposited onto image sensor 1130 on glue 1112 to adhere wafer-level lens 1120 to image sensor 1130, so as to form prior art camera module 1150. Wafer-level lens 1120 is a wafer-level lens with a substrate 1122, two lens elements 1124, and a spacer 1126 for coupling wafer-level lens 1120 to image sensor 1130. In a step 1106, a black coating 1140 is deposited on prior art camera module 1150 around wafer-level lens 1120 and image sensor 1130 to form a light tight housing. Black coating 1140 blocks at least a portion of unwanted light propagating toward image sensor 1130, i.e., light that is not properly imaged onto image sensor 1130 by wafer-level lens 1120. Thus, prior art method 1100 includes several steps that each must be performed with accuracy. For example, the process of depositing black coating 1140 includes either avoiding deposition of black coating 1140 on lens element 1124 or removing black coating 1140 from lens element 1124. Since the steps of prior art method 1100 are performed at the individual die level, as opposed to the wafer-level, the assembly and packaging cost to produce prior art camera module 1150 is significant.

FIG. 12 illustrates a scenario 1200, wherein the respective form factors of an image sensor 1230 and a wafer-level lens 1220 are such that prior art method 1100 cannot be used to assemble image sensor 1230 with wafer-level lens 1220 to form a camera module. Specifically, image sensor 1230 has small transverse extent relative to wafer-level lens 1220. This is a common scenario since image sensor manufacturing technology has advanced to produce very small image sensors, which is advantageous at least from a cost perspective. Wafer-level lens 1220 includes a substrate 1222 and two lens elements 1224. However, the lens element 1224 intended to face image sensor 1230 has a diameter so large that the spacer 1240 needed to bond substrate 1222 to image sensor 1230 cannot contact image sensor 1230. A gap 1250 exists between spacer 1240 and image sensor 1230.

FIG. 13 illustrates another scenario 1300, wherein the respective form factors of an image sensor 1330 and a wafer-level lens 1320 are such that prior art method 1100 cannot be used to reliably assemble image sensor 1330 with wafer-level lens 1320 to form a camera module. As in scenario 1200, image sensor 1330 has small transverse extent relative to wafer-level lens 1320, although the discrepancy is smaller in scenario 1300. Wafer-level lens 1320 includes a substrate 1322 and two lens elements 1324. However, the lens element 1324 intended to face image sensor 1330 has a diameter so large that the contact region 1350 between the spacer 1340, needed to bond substrate 1322 to image sensor 1330, is insufficient to achieve reliable bonding.

Figure 14:
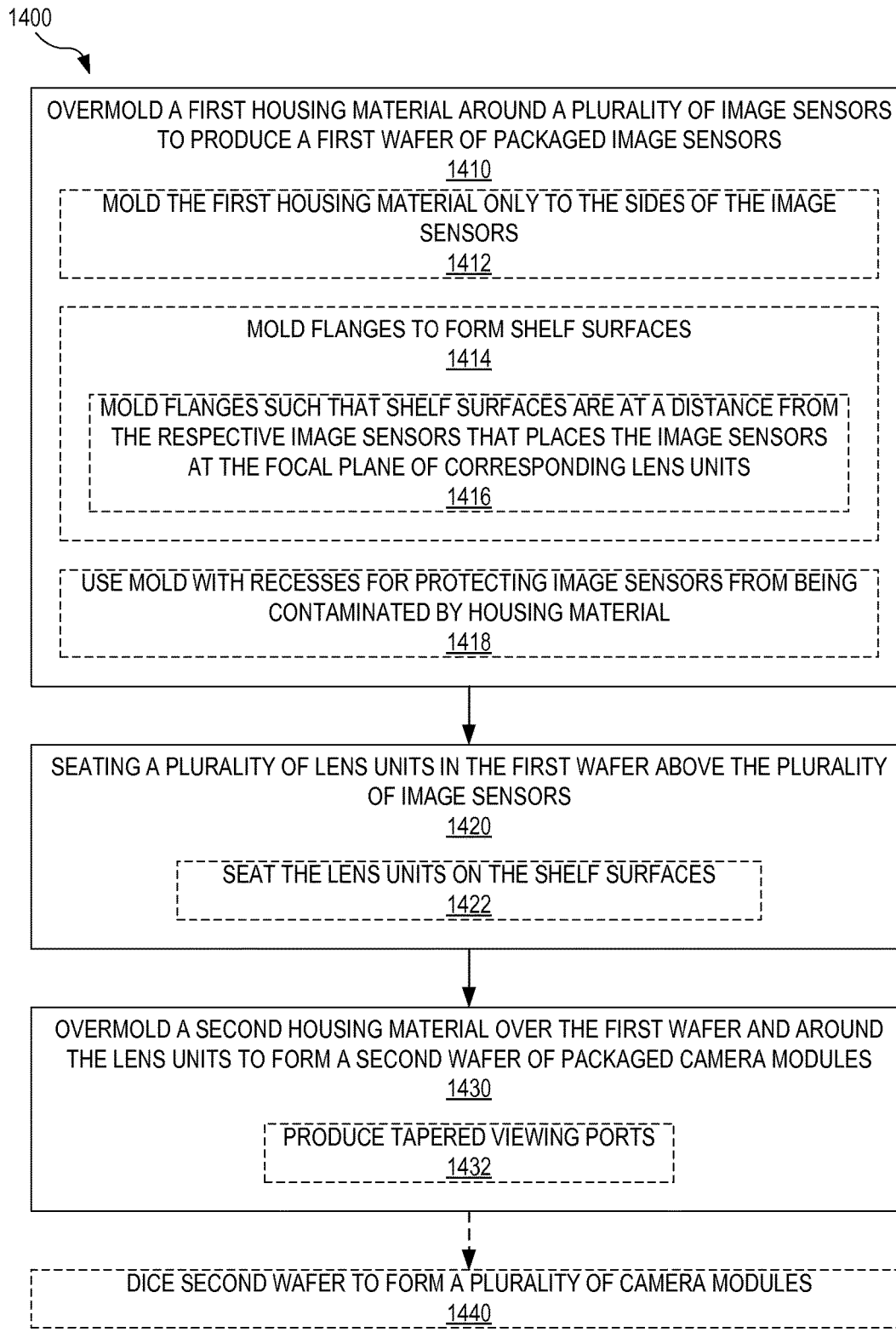
FIG. 14 illustrates a wafer-level method for packaging a plurality of camera modules, according to an embodiment.

FIG. 14 illustrates one exemplary wafer-level method 1400 for packaging a plurality of camera modules 1000. Method 1400 utilizes molding to produce a wafer camera modules 1000 packaged in housing 1040. Hence, method 1400 is ideally suited for low-cost mass production of camera modules 1000. Method 1400 does not require a step of bonding lens units to image sensors, as is the case in prior art method 1100. In addition, by virtue of mold design, method 1400 eliminates the need for a separate alignment step. Furthermore, method 1400 is capable of assembling and packaging camera modules as shown in FIGS. 12 and 13, which are incompatible with prior art method 1100.

In a step 1410, method 1400 overmolds a first housing material around a plurality of image sensors 1030 to produce a first wafer of packaged image sensors. In an embodiment, step 1400 implements a step 1412 such that the first housing material is molded only to the sides of image sensors 1030 facing away from respective optical axes 1012. In this embodiment, the housing material, upon cooling, shrinks to apply sufficient pressure on image sensors 1030 to secure image sensors 1030 in the first wafer. Step 1410 produces the first wafer such that the first wafer can accommodate a plurality of lens units 1020 above image sensors 1030, respectively. In an embodiment, step 1410 includes a step 1414 of molding flanges to form shelf surfaces for accommodating lens units 1020. Optionally, step 1414 includes a step 1416 of molding the flanges such that the shelf surfaces are at a distance from respective image sensors 1030 that places image sensors 1030 at the focal plane of corresponding lens units 1020. Step 1410 may include a step 1418 of using a mold with recesses that protect image sensors 1030 from being contaminated by the first housing material.

Figure 15:
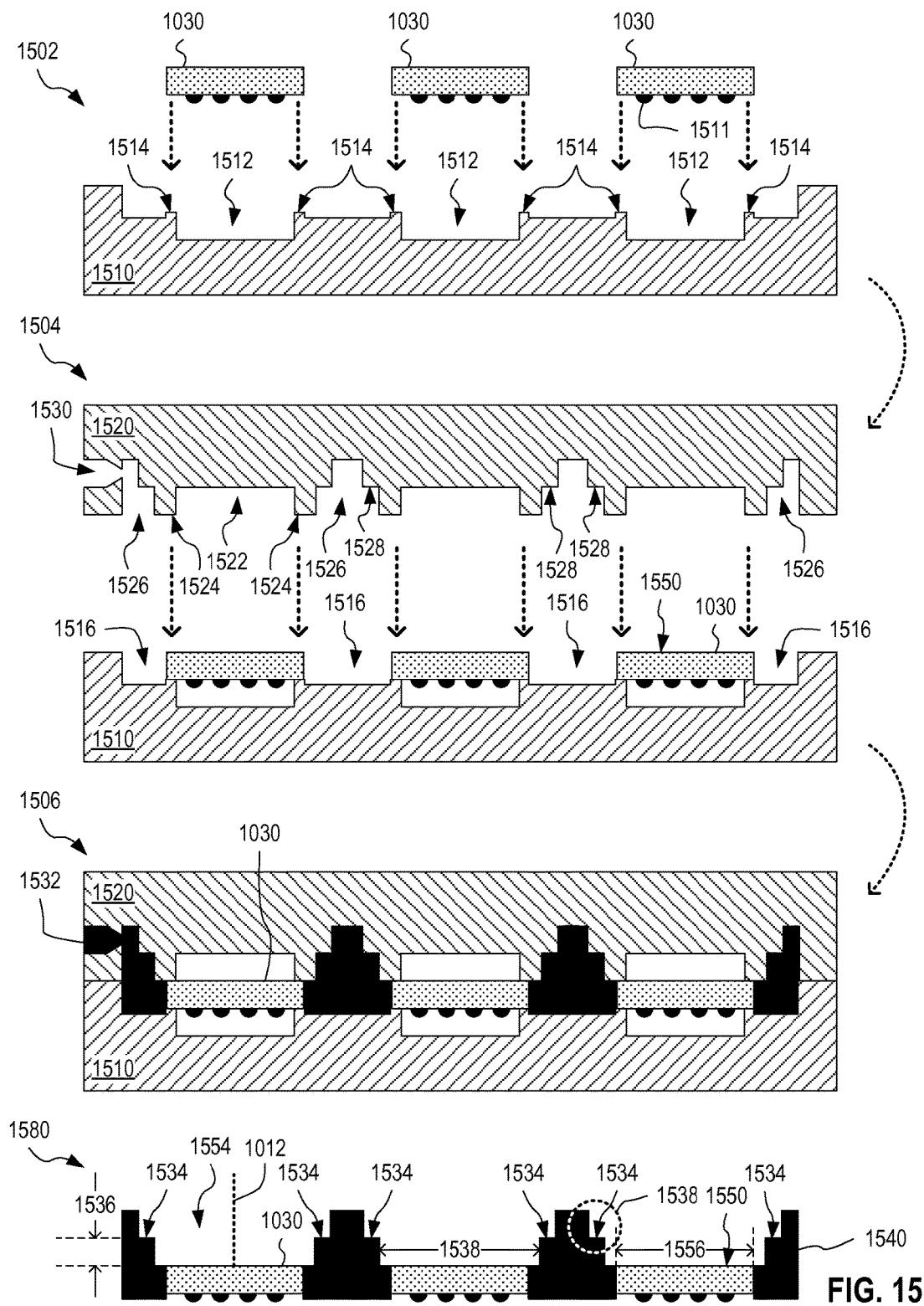
FIG. 15 illustrates, by non-limiting example, an embodiment of a portion of the method of FIG. 14.

FIG. 15 illustrates, by non-limiting example, an embodiment of step 1410 that implements all of steps 1412, 1414, 1416, and 1418. All views of FIG. 15 are cross-sectional views, with the cross section being parallel to optical axes 1012. Although FIG. 15 illustrates production of a first wafer having only three image sensors 1030, the method shown in FIG. 15 is readily extended to produce a first wafer having any number of image sensors 1030, for example hundreds or thousands of image sensors 1030.

As shown in diagram 1502 of FIG. 15, a plurality of image sensors 1030 are seated on a lower mold piece 1510. Lower mold piece 1510 has recesses 1512 for accommodating electrical contacts 1511 and/or other protruding features of image sensors 1030. For clarity of illustration, not all electrical contacts 1511 are labeled in diagram 1502. Furthermore, each image sensor 1130 may have a different number of contacts than that shown in FIG. 15, without departing from the scope hereof. Each recess 1512 is surrounded by a support surface 1514 configured to support image sensors 1030.

Next, as shown in diagram 1504 of FIG. 15, an upper mold piece 1520 is contacted to lower mold piece 1510 with image sensors 1030. Upper mold piece 1520 has recesses 1522 above each image sensor 1030. Each recess 1522 is surrounded by a surface 1524 configured to contact image sensors 1030 adjacent to respective light receiving surfaces 1550 thereof. Upper mold piece 1520 also includes recesses 1526 that circumnavigates each recess 1522. Recesses 1526 include surfaces 1528 facing lower mold piece 1510 and located only at partial depth of recesses 1526 into upper mold piece 1520. Upper mold piece 1520 includes a gate 1530 for receiving a first housing material. Without departing from the scope hereof, gate 1530 may be incorporated in lower mold piece 1510 instead of in upper mold piece 1520. For clarity of illustration, not all recesses 1522, surfaces 1524, surfaces 1528, and light-receiving surfaces 1550 are labeled in diagram 1504.

After contacting upper mold piece 1520 to lower mold piece 1510, with image sensors 1030, first housing material 1532 is injected through gate 1532 into empty cavities between upper mold piece 1520 and lower mold piece 1510 (see diagram 1506 of FIG. 15). Housing material 1532 may be opaque. The process depicted in diagram 1506 results in production of a first wafer 1580 with image sensors 1030 packaged in a housing 1540 formed from housing material 1532. For clarity of illustration, FIG. 15 shows a detailed view of first wafer 1580 separate from mold pieces 1510 and 1520. However, method 1400 does not require that first wafer 1580 is separated from lower mold piece 1510. In first wafer 1580, each image sensor 1030 is surrounded by housing 1540 in dimensions orthogonal to respective optical axis 1012. In the embodiment shown in FIG. 15, housing material 1532 contacts only sides of image sensors 1030 facing away from respective optical axes 1012. Without departing from the scope hereof, mold pieces 1510 and 1520 may be shaped such that housing material 1532 also contacts other portions of image sensors 1030, as long as light-receiving surface 1550 and electrical contacts are not covered by housing material 1532. Housing material 1532 shrinks upon cooling, such that housing 1540 applies pressure at least on the sides of image sensors 1030 facing away from respective optical axes 1012. This pressure is sufficient to secure image sensors 1030 in housing 1540. For each image sensor 1030, housing 1540 forms a seal to the sides of image sensor 1030 facing away from optical axis 1012, wherein this seal circumnavigates optical axis 1012. Thus, in embodiments where housing material 1532 is opaque, housing 1540 forms a light tight seal with these sides of image sensor 1030. For clarity of illustration, not all optical axes 1012 and not all image sensors 1030 are labeled in the FIG. 15 depiction of first wafer 1580.

For each image sensor 1030, housing 1540 forms an opening above light-receiving surface 1550. Immediately above image sensor 1030, this opening has a width 1538, which exceeds a corresponding width 1556 of image sensor 1030, such that housing 1540 does not interfere with light propagating toward light-receiving surface 1550 or in other ways impede the performance of image sensor 1030. The section of housing 1540 having width 1538 extends upwards from image sensor 1030 along optical axis 1012 for a distance 1536. At distance 1536 from image sensor 1030, housing material 1534 opens up in the direction away from optical axis 1012 to form a flange 1538 with a shelf surface 1534. Flange 1538 is configured to accept lens unit 1020 with lens unit 1020 initially resting on shelf surface 1536. In one embodiment, distance 1536 is such that when lens unit 1020 is placed on shelf surface 1534, image sensor 1030 is at the focal plane of lens unit 1020. For clarity of illustration, not all flanges 1538 are labeled in the FIG. 15 depiction of first wafer 1580.

Referring again to FIG. 14, in a step 1420, method 1400 seats a plurality of lens units 1020 in the first wafer formed in step 1410. Each lens unit 1020 is seated above a corresponding image sensor 1030. In embodiments of method 1400 that include step 1414, step 1420 may implement a step 1422 of seating each lens unit 1020 on a shelf surface of the housing of the first wafer.

In a step 1430, method 1400 overmolds a second housing material over the first wafer and around lens units 1020 seated therein to form a second wafer of camera modules 1000 packaged in housing 1040. Step 1430 may include a step 1432 of producing a tapered viewing port for each lens unit 1020.

Figure 16:
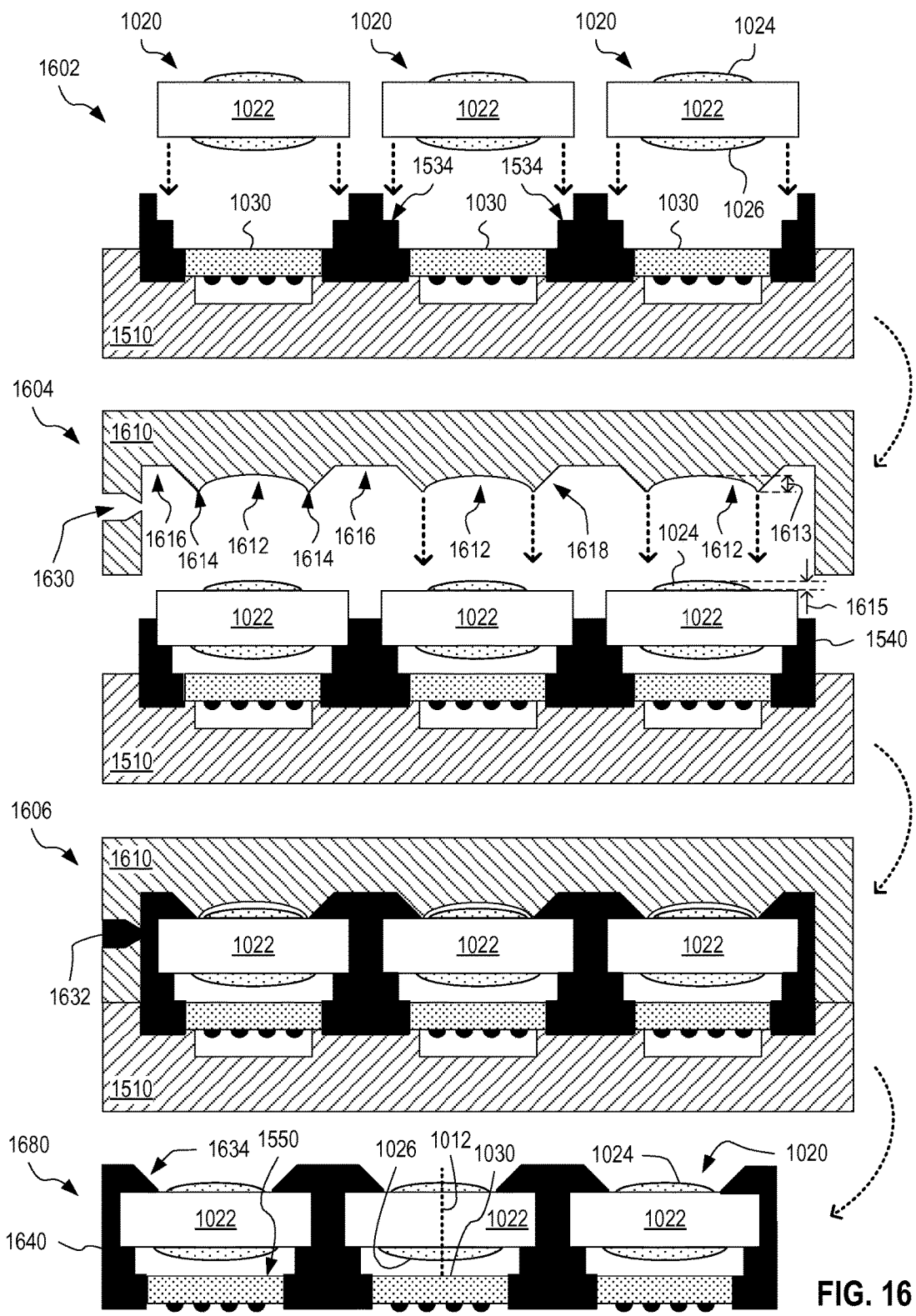
FIG. 16 illustrates, by non-limiting example, an embodiment of another portion of the method of FIG. 14.

FIG. 16 illustrates, by non-limiting example, an embodiment of steps 1420 and 1430 of method 1400, which implements steps 1422 and 1432. All views of FIG. 16 are cross-sectional views as used in FIG. 15. Although FIG. 16 illustrates production of a second wafer having only three image sensors 1030 and three lens units 1020, the method shown in FIG. 16 is readily extended to produce a second wafer having any number of image sensors 1030 and corresponding lens units 1020, for example hundreds or thousands of image sensors 1030 and corresponding lens units 1020.

FIG. 16 depicts each lens unit 1020 as being a wafer-level lens. However, as discussed above in reference to FIG. 10, lens unit 1020 may be another type of lens, without departing from the scope hereof.

Diagram 1602 illustrates an example of step 1420 that implements step 1422. For each image sensor 1030, a lens unit 1020 is placed on shelf surface 1534. In the example shown in FIG. 16, lens unit 1020 is a wafer-level lens including substrate 1022, lens element 1024, and lens element 1026. In this example, substrate 1022 rests on shelf surface 1534 such that lens element 1026 is suspended over image sensor 1030. Without departing from the scope hereof, lens unit 1020 may be another type of lens, as discussed above in reference to FIG. 10. For clarity of illustration, not all shelf surfaces 1534, lens elements 124, and lens elements 126 are labeled in diagram 1602.

Diagrams 1604 and 1606 illustrate an example of step 1430 that implements step 1432. As shown in diagram 1640, an upper mold piece 1610 is contacted to lower mold piece 1510 with lens units 1020 seated therein. Upper mold piece 1610 includes a recess 1612 above each lens unit 1020. Each recess 1612 is surrounded by a surface 1614. Recess 1612 and surface 1614 cooperate to protect an optical surface, of lens unit 1020 and facing upper mold piece 1610, from (a) contacting upper mold piece 1610 and (b) being contaminated by housing material 1632 injected into the mold formed by lower mold piece 1510 and upper mold piece 1610. Surface 1614 contacts lens unit 1020 away from this optical surface and forms a seal around the optical surface. This seal ensures that housing material 1632 injected into the mold (formed by lower mold piece 1510 and upper mold piece 1610) cannot reach the optical surface. In the example shown in FIG. 16, recesses 1612 and surfaces 1614 protect lens elements 1024. For each lens unit 1020, surface 1614 seals to substrate 1022 close to but at a distance from lens element 1024. The height 1615 of lens element 1024 away from substrate 1022 is less than the depth 1613 of recess 1612 relative to surface 1614. Thus, for each lens unit 1020, recess 1612 and surface 1614 protects lens element 1024. For clarity of illustration, not all surfaces 1614 and lens elements 1024 are labeled in diagram 1604.

Upper mold piece 1610 further includes recesses 1612 located above housing 1540. In the example shown in FIG. 16, recesses 1612 has tapered walls 1618. For clarity of illustration, not all recesses 1616 and tapered walls 1618 are labeled in diagram 1604.

Additionally, upper mold piece 1610 includes a gate 1630 for receiving a first housing material. Without departing from the scope hereof, gate 1630 may be incorporated in lower mold piece 1610 instead of in upper mold piece 1610. As shown in diagram 1606, housing material is injected through gate 1630 into empty cavities between upper mold piece 1610 and lower mold piece 1510. Housing material 1632 may be opaque and/or be identical to housing material 1532. The process depicted in diagrams 1604 and 1606 results in production of a second wafer 1680 with image sensors 1030 and lens units 1020 packaged in a housing 1640 formed from housing materials 1532 and 1632. For clarity of illustration, FIG. 16 shows a detailed view of second wafer 1680 after releasing second wafer 1680 from mold pieces 1510 and 1610. Housing material 1632 contacts housing 1540 to form housing 1640. In certain embodiments, housing material 1632 contacts surface portions of housing 1540 circumnavigating each optical axis 1012, to prevent light leakage into camera modules formed from second wafer 1680 between the housing material 1634 and housing 1540. Housing 1640 supports image sensors 1030 and lens units 1020, and mold pieces 1510 and 1610 are configured to ensure proper alignment of lens units 1020 to image sensors 1030. For each image sensor 1030 and corresponding lens unit 1020, housing 1640 circumnavigates optical axis 1012.

In embodiments where housing materials 1532 and 1632 are opaque, housing 1640 forms, for each image sensor 1030 and corresponding lens unit 1020, a light tight enclosure around light-receiving surface 1550, the space between light-receiving surface 1550 and lens unit 1020, and lens unit 1020 apart from a viewing port above lens unit 1020. This light tight enclosure circumnavigates optical axis 1012. In the example shown in FIG. 16, the viewing port has tapered sides 1634 formed by tapered walls 1618. For clarity of illustration, not all light-receiving surfaces 1550, image sensors 1030, lens units 1020, lens elements 1024, lens elements 1026, optical axes 1012, and tapered sides 1634 are labeled in the FIG. 16 depiction of second wafer 1680.

Referring again to FIG. 14, in an optional step 1440, method 1400 dices the second wafer to form a plurality of camera modules. In one embodiment, the second wafer is diced to form a plurality of camera modules 1010. In another embodiment, the second wafer is diced to produce a plurality of array camera modules 1060. In yet another embodiment, the second wafer is diced to form both camera modules 1010 and 1060.

Figure 17:
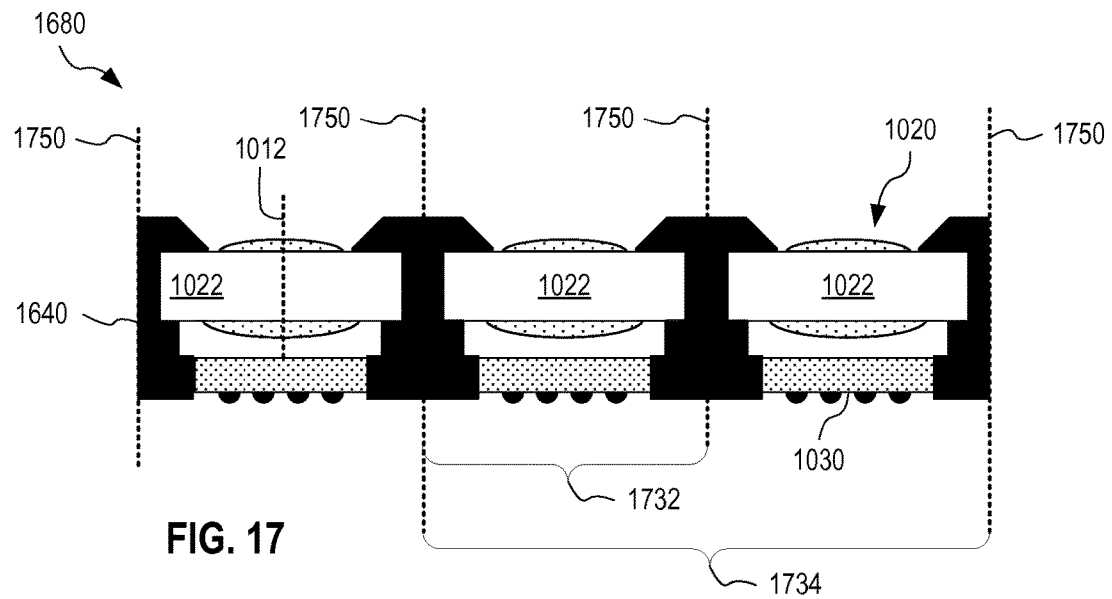
FIG. 17 illustrates, by non-limiting example, an embodiment of yet another portion of the method of FIG. 14.

FIG. 17 illustrates, by non-limiting example, an embodiment of step 1440 of method 1400. The view in FIG. 17 is a cross-sectional view as used in FIG. 15. Although FIG. 17 illustrates dicing of a second wafer having only three image sensors 1030 and three lens units 1020, the method shown in FIG. 17 is readily extended to produce a first wafer having any number of image sensors 1030, for example hundreds or thousands of image sensors.

As shown in FIG. 17, second wafer 1680 is diced along dicing lines 1750. Dicing lines 1750 intersect housing 1640 between lens units 1020. In one example, second wafer 1680 is diced along all dicing lines 1750 to produce a plurality of camera modules 1732. Each camera module 1732 is an embodiment of camera module 1010. In another example, second wafer 1680 is diced along some but not all of dicing lines 1750 to produce array camera modules 1734 and, optionally, camera modules 1732. Array camera module 1734 is an embodiment of array camera module 1060. Without departing from the scope hereof, array camera module 1734 may include more image sensors 1030 and corresponding lens units 1020 than shown in FIG. 17. For example, step 1440 may dice second wafer 1680 to produce one or more array camera modules 1734 configured as a 2×2 array camera module with two adjacent non-collinear rows each having two camera modules, or a 1×3 array camera having three camera modules arranged on a line. Each camera module 1732 produced in step 1440 includes a portion of housing 1640 circumnavigating optical axis 1012. Likewise, for each array camera module 1734, each pair of image sensor 1030 and corresponding lens unit 1020 is circumnavigated by a portion of housing 1640. For clarity of illustration, not all lens units 1020, image sensors 1030, and optical axes 1012 are labeled in FIG. 17.

Figure 18A:
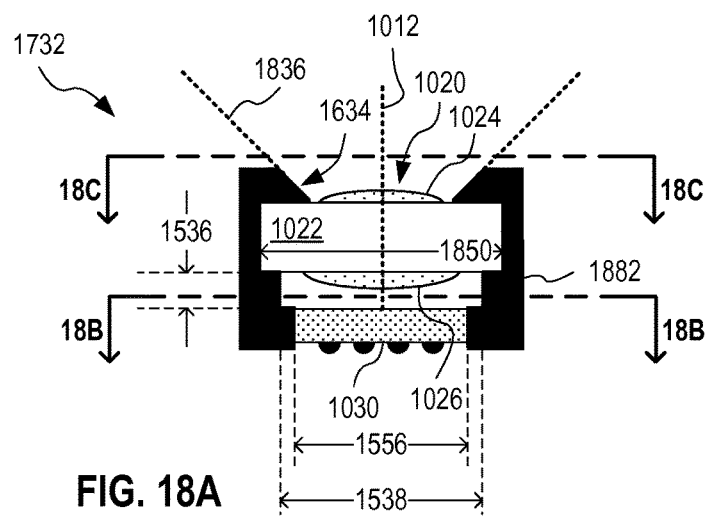
FIGS. 18A-C show a camera module produced by the method of FIG. 14, according to an embodiment.
Figure 18B:
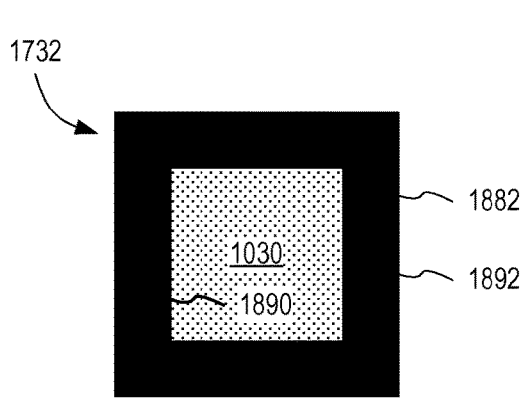
Figure 18C:
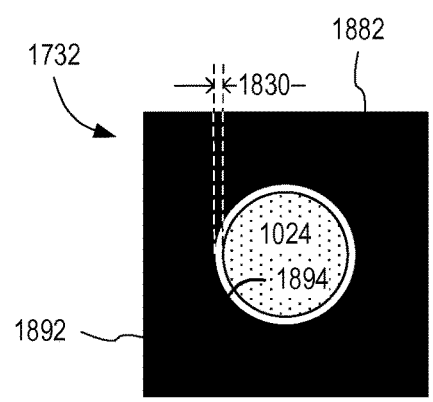

FIGS. 18A-C show camera module 1732 in further detail. FIG. 18A is a cross-sectional view of camera module 1732 with the cross section being parallel to optical axis 1012. FIG. 18B is a view of camera module 1732 from line 18B-18B of FIG. 18A toward image sensor 1030 in a direction parallel to optical axis 1012. FIG. 18C is a view of camera module 1732 from line 18C-18C of FIG. 18A toward lens unit 1020 in a direction parallel to optical axis 1012. FIGS. 18A-C are best viewed together. Camera module 1732 includes image sensor 1030, lens unit 1020, and a housing 1882. Housing 1882 is a portion of housing 1640 formed when dicing second wafer 1680 in step 1440. Housing 1882 may be opaque.

Width 1556, width 1538, and distance 1536 of camera module 1732 are as discussed in reference to FIG. 15. Tapered sides 1634 defines a maximum field-of-view 1836 for camera module 1732. Substrate 1022 of lens unit 1020 has width 1850. Width 1850 is greater than width 1538. In one embodiment, the extent (for clarity of illustration, not indicated in FIG. 18A) of lens element 1026 is similar to width 1556 or even greater than width 1556. This embodiment of camera module 1732 would not be manufacturable using prior art method 1100. However, method 1400 is capable of manufacturing embodiments of camera module 1732 having such dimensional relationships between lens unit 1020 and image sensor 1030.

As shown in FIG. 18B, the inner perimeter 1890 of housing 1882, below lens unit 1020, is rectangular to match the rectangular shape of image sensor 1030. The outer perimeter 1892 of housing 1882 is also rectangular as defined by dicing lines 1750. Without departing from the scope hereof, inner perimeter 1890 may have shape different from rectangular to match a non-rectangularly shaped image sensor 1030. Likewise, outer perimeter 1882 may be non-rectangular, if dicing lines 1750 do not cross at right angles.

As shown in FIG. 18C, above lens unit 1020, the inner perimeter 1894 of housing 1882 is circular to match the circular shape of lens element 1024. Inner perimeter 1894 of housing 1882 is a distance 1830 away from lens element 1024. Distance 1830 may be made as small as possible while allowing for surface 1614 to seal to substrate 1022 in step 1430, so as to prevent, or at least reduce, light leakage into camera module 1732 through substrate 1022. Without departing from the scope hereof, inner perimeter 1894 may have shape different from circular, for example to match a non-circularly shaped lens element 1024.

Method 1400 is readily extended to produce camera modules 1732 with housing 1882 shaped differently from that shown in FIGS. 18A-C. This may be achieved by using mold pieces with shapes different from those shown in FIGS. 15 and 16. For example, tapered sides 1634 may be replaced by straight sides similar to those shown in FIG. 6 or by sides with microstructure similar to that shown in FIG. 7.

FIG. 19 shows array camera module 1734 in further detail. FIG. 19 is a cross-sectional view of camera module 1732 with the cross section being parallel to optical axes 1012. Array camera module 1734 includes a plurality of image sensors 1030, a plurality of respective lens units 1020 and a housing 1982. Housing 1982 is a portion of housing 1640 formed when dicing second wafer 1680 in step 1440. Housing 1982 may be opaque. Array camera module 1734 includes a plurality of array camera modules 1732 with properties as discussed above in reference to FIGS. 17 and 18A-C.

FIGS. 20A and 20B illustrate one exemplary camera module 2000 that is a more general embodiment of camera module 1010 than that shown in FIG. 10. Camera module 2000 is a generalization of camera module 1732, and may be produced by method 1400. Camera module 2000 includes image sensor 1030, a lens unit 2010, and housing 1882. FIG. 20A is a cross-sectional view of camera module 2000 with the cross section being parallel to optical axis 1012. FIG. 20B shows lens unit 2010 alone in the same cross-sectional view as used for FIG. 20A. FIGS. 20A and 20B are best viewed together.

Lens unit 2010 may be any type of lens having a protruding portion 2012 extending away from optical axis 1012, such that housing 1882 may be configured to hold lens unit 2010 by holding protruding portion 2012. Lens unit 2010 may also replace one or more lens units 1020 in array camera modules 1060 and 1734.

Combinations of Features

Features described above as well as those claimed below may be combined in various ways without departing from the scope hereof. For example, it will be appreciated that aspects of one wafer-level packaging method, or an associated camera module or lens assembly, described herein may incorporate or swap features of another wafer-level packaging method, or an associated camera module or lens assembly, described herein. The following examples illustrate possible, non-limiting combinations of embodiments described above. It should be clear that many other changes and modifications may be made to the methods and device herein without departing from the spirit and scope of this invention:

(A1) A method for packaging wafer-level lenses may apply to a plurality of wafer-level lenses, each having (a) a substrate with opposite facing first and second surfaces and (b) a respective lens element on at least one of the first and second surfaces, each lens element having a lens surface facing away from the substrate.

(A2) The method denoted as (A1) may include partially encasing the plurality of wafer-level lenses with a housing material to produce a wafer of packaged wafer-level lenses.

(A3) In the method denoted as (A2), the housing material may support each of the plurality of wafer-level lenses by contacting the respective substrate.

(A4) In the method denoted as (A3), the housing may be shaped to form, within the wafer of packaged wafer-level lenses, a plurality of housings for the plurality of wafer-level lenses, respectively.

(A5) In the method denoted as (A4), each of the housings may have openings for allowing light propagation through the plurality of wafer-level lenses, respectively.

(A6) In each of the methods denoted as (A2) through (A5), the step of partially encasing may include shaping the housing material such that each of the housings extends inwards toward optical axis of the wafer-level lens along both the first surface and the second surface.

(A7) In each of the methods denoted as (A2) through (A6), the housing material may be opaque to prevent leakage of external light through the housing material into optical path associated with each of the wafer-level lenses.

(A8) In each of the methods denoted as (A2) through (A7), the step of partially encasing may include (a) disposing the plurality of wafer-level lenses in a mold, (b) injecting the housing material into the mold, and (c) forming the wafer of packaged wafer-level lenses by hardening the housing material in the mold.

(A9) In the method denoted as (A8), the mold may include first recesses for forming the plurality of housings through the steps of disposing, injecting, and molding.

(A10) In the method denoted as (A9), the mold may further include second recesses having depth in excess of protrusion depth into the mold of a lens surface associated with the individual second recesses, to prevent deposition of the housing material on the lens surface.

(A11) Each of the methods denoted as (A2) through (A10) may further include dicing the wafer of packaged wafer-level lenses to form a plurality of packaged wafer-level lens assemblies, each including at least one of the wafer-level lenses.

(A12) The method denoted as (A11) may further include bonding at least one of the plurality of packaged wafer-level lens assemblies to an image sensor module to form an optical assembly.

(A13) In the method denoted as (A12), the step of bonding may include bonding the housing material to the image sensor module.

(A14) In each of the methods denoted as (A2) through (A13), the step of partially encasing may include shaping the wafer of packaged wafer-level lenses such that a portion of the housing material forms spacers facing away from the first surface.

(A15) In the method denoted as (A14), the spacers may have extent, in direction along optical axis of the wafer-level lenses, according to pre-specified spacing between (a) each of the wafer-level lenses and a (b) a respective image sensor module separate from the wafer of packaged wafer-level lenses.

(A16) The method denoted as (A15) may further include dicing the wafer of packaged wafer-level lenses to produce a plurality of packaged wafer-level lens assemblies, wherein each wafer-level lens assembly includes at least one of the wafer-level lenses and at least one of the spacers.

(A17) The method denoted as (A16) may further include mounting at least one of the packaged wafer-level assemblies onto the respective image sensor module, at the pre-specified spacing, using the at least one of the spacers.

(A18) In the method denoted as (A17), the step of shaping may include shaping the housing material such that each one of the wafer-level lenses is associated with an enclosure of optical path of the one of the wafer-level lenses along the first extent, wherein the enclosure is formed by the spacers.

(A19) In the method denoted as (A18), the step of dicing may include dicing the wafer of packaged wafer-level lenses to produce the packaged wafer-level lens assemblies, each including exactly one of the wafer-level lenses and exactly one of the spacers.

(A20) In the method denoted as (A19), the housing material may be opaque such that, for each of the at least one of the packaged wafer-level assemblies, the one of the spacers prevents leakage of external light into optical path associated with the one of the wafer-level lenses.

(A21) In the method denoted as (A18), the step of dicing may include dicing the wafer of packaged wafer-level lenses such that the at least one of the packaged wafer-level lens assemblies, referred to in the step of mounting, includes N of the wafer-level lenses and enclosures associated with the N of the wafer-level lenses, wherein N is an integer greater than one.

(A22) In the method denoted as (A21), in the step of mounting, the respective image sensor module may have N image sensors.

(A23) In the method denoted as (A22), the step of mounting may include bonding the one of the at least one of the packaged wafer-level lens assemblies onto the respective image sensor module to form at least a portion of an array camera.

(A24) In the method denoted as (A23), the housing material may be opaque to prevent light leakage between individual cameras of the array camera.

(A25) In each of the methods denoted as (A2) through (A24), the step of partially encasing may include shaping the wafer of packaged wafer-level lenses such that a portion of the housing material forms flanges, facing away from the first surface, for mounting at least some of the wafer-level lenses onto a respective image sensor module separate from the wafer of packaged wafer-level lenses.

(A26) The method denoted as (A25) may further include dicing the wafer of packaged wafer-level lenses to produce a plurality of packaged wafer-level lens assemblies, each including at least one of the wafer-level lenses and at least one of the flanges.

(A27) The method denoted as (A26) may further include mounting, for at least one of the packaged wafer-level lens assemblies, a respective one of the flanges onto perimeter of the respective image sensor module.

(A28) In the method denoted as (A27), the step of dicing may include dicing the wafer of packaged wafer-level lenses such that the at least one of the packaged wafer-level lens assemblies, referred to in the step of mounting, includes N of the wafer-level lenses and a portion of the flanges, wherein N is an integer greater than one.

(A29) In the method denoted as (A28), the step of forming flanges may include producing, for the at least one of the packaged wafer-level lens assemblies a peripheral flange describing a peripheral path circumnavigating the N of the wafer-level lenses, collectively, in a plane orthogonal to optical axes of the N of the wafer-level lenses.

(A30) In the method denoted as (A29), the step of dicing may include dicing the wafer of packaged wafer-level lenses such that the at least one of the packaged wafer-level lens assemblies includes N of the wafer-level lenses and the peripheral flange.

(A31) In the method denoted as (A30), in the step of mounting, the respective image sensor module may have N image sensors.

(A32) In the method denoted as (A31), the step of mounting may include, for each one of the at least one of the packaged wafer-level lens assemblies, bonding the peripheral flange onto the respective image sensor module to form an array camera.

(A33) In the method denoted as (A32), the housing material may be opaque such that the peripheral flange prevents leakage of external light through the housing material into optical paths associated with the N of the wafer-level lenses.

(A34) In the method denoted as (A33), the step of shaping the wafer may further include, for each of the at least one of the packaged wafer-level lens assemblies, forming at least one spacer facing away from the first surface.

(A35) In the method denoted as (A34), each of the at least one spacer may have extent, in direction along optical axis of the N of the wafer-level lenses, according to pre-specified spacing between (a) the N of the wafer-level lenses and (b) the respective image sensor module, the at least one spacer being configured to prevent light leakage between individual cameras of the array camera.

(B1) A lens assembly may include a wafer-level lens with (a) a substrate with opposite facing first and second surfaces and (b) a respective lens element on at least one of the first and second surfaces, wherein each lens element has a lens surface facing away from the substrate.

(B2) The lens assembly denoted as (B1) may further include an integrally formed housing contacting the substrate and extending inwards toward optical axis of the wafer-level lens along both the first surface and the second surface.

(B3) In the lens assembly denoted as (B2), the integrally formed housing may be opaque.

(B4) In the lens assembly denoted as (B3), the integrally formed housing may circumnavigate the wafer-level lens in dimensions orthogonal to the optical axis.

(B5) Each of the lens assemblies denoted as (B2) through (B4) may be manufactured using one or more of the methods denoted as (A2) through (A35).

(C1) A wafer-level method for packaging a plurality of camera modules may include (a) overmolding a first housing material around a plurality of image sensors to produce a first wafer of packaged image sensors, (b) seating a plurality of lens units in the first wafer above the plurality of image sensors, respectively, and (c) overmolding a second housing material over the first wafer and around the lens units to form a second wafer of packaged camera modules, wherein each of the packaged camera modules includes one of the image sensors and one of the lens units, and wherein the second housing material cooperates with the first housing material to secure the lens units in the second wafer.

(C2) In the method denoted as (C1), the step of overmolding a second housing material may include contacting the second housing material to surface portions of the first wafer surrounding each of the packaged camera modules, to prevent light leakage into the packaged camera modules between the first housing material and the second housing material.

(C3) In either or both of the methods denoted as (C1) and (C2), the step of overmolding a first housing material may include molding a plurality of flanges having a respective plurality of shelf surfaces orthogonal to the optical axis of each of the image sensors, respectively.

(C4) In the method denoted as (C3), the step of seating a plurality of lens units may include seating the lens units on the shelf surfaces, respectively.

(C5) In the method denoted as (C4), each of the lens units may include a planar substrate.

(C6) In the method denoted as (C5), the step of seating may include, for each of the lens units, seating the planar substrate on a respective one of the shelf surfaces.

(C7) In any of the methods denoted as (C3) through (C6), the step of molding a plurality of flanges may include molding the flanges such that each of the flanges circumnavigates the optical axis of a respective one of the image sensors.

(C8) In any of the methods denoted as (C3) through (C7), each of the lens units may have a fixed focal length.

(C9) In any of the methods denoted as (C3) through (C8), the step of molding a plurality of flanges may include molding each of the shelf surfaces at a distance, along the optical axis, from a respective one of the image sensors such that the respective one of the image sensors is located at the focal plane of a respective one of the lens units.

(C10) In any of the methods denoted as (C3) through (C9), the step of molding a plurality of flanges may include molding each of the shelf surfaces around an opening to a respective one of the image sensors, wherein the opening has larger extent than the respective one of the image sensors in dimensions orthogonal to optical axis of the respective one of the image sensors.

(C11) In any of the methods denoted as (C1) through (C10), the step of overmolding a first housing material may include molding the first housing material only to sides of the image sensors facing away from the optical axis of each of the image sensors, such that the first wafer supports the image sensors through pressure of the first housing material on the sides after cooling-associated shrinkage of the first housing material.

(C12) In any of the methods denoted as (C1) through (C11), the step of overmolding a first housing material may include (a) placing the image sensors over respective recesses in a bottom mold surface such that a planar portion of bottom surface of each of the image sensors rests on a planar portion of the bottom mold surface surrounding a respective one of the recesses, wherein the bottom surface are opposite light receiving surface of the respective one of the image sensors, (b) depositing the first housing material on portions of the bottom mold surface not occupied by the image sensors, and (c) contacting a top mold surface to a portion of top surface of the image sensor surrounding the light receiving surface, to mold the first housing material to fill gaps between the image sensors, so as to form the first wafer.

(C13) In any of the methods denoted as (C1) through (C12), the step of overmolding a first housing material may include, for each of the image sensors, molding the first housing material to each of the image sensors along a path that circumnavigates an associated light receiving surface, to prevent light leakage to the light receiving surface between the first housing material and the each of the image sensors.

(C14) In any of the methods denoted as (C1) through (C13), each of the lens units may include a substrate, and the step of overmolding a second housing material may include, for each of the lens units, molding the second housing material over a portion of the substrate facing away from an associated one of the image sensors, to prevent light leakage into a respective one of the packaged camera modules through the substrate.

(C15) Any of the methods denoted as (C1) through (C14) may further include dicing the second wafer to produce a plurality of packaged array camera modules each including two or more individual ones of the packaged camera modules.

(D1) A camera module may include an image sensor having a light-receiving surface and sides facing away from an optical axis of the camera module, a lens unit for imaging a scene onto the image sensor, the lens unit including a substrate, and a housing holding the image sensor and the lens unit, wherein the housing contacts the sides.

(D2) In the camera module denoted as (D1), the housing and the image sensor may cooperate to form a light-tight enclosure, apart from a viewing port for viewing a scene, around the lens unit and around space between the image sensor and the lens unit.

(D3) In either or both of the camera modules denoted as (D1) and (D2), the housing may contact only the sides.

(D4) In any of the camera modules denoted as (D1) through (D3), the housing may hold the image sensor through pressure between the housing and the sides.

(D5) In the camera module denoted as (D4), the housing may be composed of an opaque polymer.

(D6) In any of the camera modules denoted as (D1) through (D5), the interface between the housing and the image sensor may be free of adhesive.

(D7) In any of the camera modules denoted as (D1) through (D6), the housing may extend inwards toward the optical axis along a surface of the substrate facing away from the image sensor.

(D8) In any of the camera modules denoted as (D1) through (D7), the lens unit may have larger extent than the image sensor away from the optical axis.

Changes may be made in the above systems and methods without departing from the scope hereof. It should thus be noted that the matter contained in the above description and shown in the accompanying drawings should be interpreted as illustrative and not in a limiting sense. The following claims are intended to cover generic and specific features described herein, as well as all statements of the scope of the present method and systems, which, as a matter of language, might be said to fall therebetween.

What is claimed is:

1. A wafer-level method for packaging a plurality of camera modules, comprising:
   overmolding a first housing material around a plurality of image sensors to produce a first wafer of packaged image sensors, the plurality of image sensors being supported in the first wafer exclusively by the first housing material, said overmolding a first housing material including molding the first housing material only to sides of the image sensors facing away from the optical axis of each of the image sensors and not to sides of the image sensors facing along the optical axis, such that the first wafer supports the image sensors through pressure of the first housing material on the sides after cooling-associated shrinkage of the first housing material;
   seating a plurality of lens units on the first housing material above the plurality of image sensors, respectively; and
   after the step of seating, overmolding a second housing material over the first wafer and around the lens units to form a second wafer of packaged camera modules each including one of the image sensors and one of the lens units, the second housing material cooperating with the first housing material to secure the lens units in the second wafer.

2. The method of claim 1, the step of overmolding a second housing material comprising:
   contacting the second housing material to surface portions of the first wafer surrounding each of the packaged camera modules, to prevent light leakage into the packaged camera modules between the first housing material and the second housing material.

3. The method of claim 1, the step of molding the first housing material comprising: molding a plurality of flanges having a respective plurality of shelf surfaces orthogonal to the optical axis of each of the image sensors, respectively the shelf surfaces being recessed from a top surface of the flanges farthest from the image sensors.

4. The method of claim 3, the step of seating a plurality of lens units comprising seating the lens units on the shelf surfaces, respectively, the lens unit having at least one curved lens surface.

5. The method of claim 4, each of the lens units including a planar substrate, the step of seating comprising, for each of the lens units, seating the planar substrate on a respective one of the shelf surfaces.

6. The method of claim 3, the step of molding a plurality of flanges comprising molding the flanges such that each of the flanges circumnavigates the optical axis of a respective one of the image sensors.

7. The method of claim 3, each of the lens units having a fixed focal length, the step of molding a plurality of flanges comprising molding each of the shelf surfaces at a distance, along the optical axis, from a respective one of the image sensors such that the respective one of the image sensors is located at the focal plane of a respective one of the lens units.

8. The method of claim 3, the step of molding a plurality of flanges comprising molding each of the shelf surfaces around an opening to a respective one of the image sensors, the opening having larger extent than the respective one of the image sensors in dimensions orthogonal to optical axis of the respective one of the image sensors.

9. The method of claim 1, the step of overmolding a first housing material further comprising:
   placing the image sensors over respective recesses in a bottom mold surface such that a planar portion of bottom surface of each of the image sensors rests on a planar portion of the bottom mold surface surrounding a respective one of the recesses, the bottom surface being opposite light receiving surface of the respective one of the image sensors;
   depositing the first housing material on portions of the bottom mold surface not occupied by the image sensors; and
   contacting a top mold surface to a portion of top surface of the image sensor surrounding the light receiving surface, to mold the first housing material to fill gaps between the image sensors, so as to form the first wafer.

10. The method of claim 1, the step of molding the first housing material comprising, for each of the image sensors:
molding the first housing material to each of the image sensors along a path that circumnavigates an associated light receiving surface, to prevent light leakage to the light receiving surface between the first housing material and the each of the image sensors.

11. The method of claim 1, each of the lens units including a substrate, the step of overmolding a second housing material comprising, for each of the lens units:
molding the second housing material over a portion of the substrate facing away from an associated one of the image sensors, to prevent light leakage into a respective one of the packaged camera modules through the substrate.

12. The method of claim 1, further comprising:
dicing the second wafer to produce a plurality of packaged array camera modules each including two or more individual ones of the packaged camera modules.

13. The method of claim 1, in the step of overmolding a first housing material comprising mechanically coupling the image sensors to each other exclusively via the first housing material.

14. A camera module comprising:
an image sensor;
a lens unit for imaging a scene onto the image sensor, the lens unit including a substrate; and
a housing holding the image sensor and the lens unit, the housing forming a single continuous structure that (a) applies pressure to sides of the image sensor to support the image sensor and secure the image sensor in the housing, the sides facing away from an optical axis of the camera module, (b) supports the lens unit, and (c) extends inwards toward the optical axis along both a first surface and a second surface of the substrate respectively facing and facing away from the image sensor.

15. The camera module of claim 14, the housing and the image sensor cooperating to form a light-tight enclosure, apart from a viewing port for viewing a scene, around the lens unit and around space between the image sensor and the lens unit.

16. The camera module of claim 14, the housing being composed of an opaque polymer.

17. The camera module of claim 14, an interface between the housing and the image sensor being free of adhesive.

18. The camera module of claim 14, the lens unit having larger extent than the image sensor away from the optical axis, the lens unit having at least one curved lens surface.

19. The camera module of claim 14, the housing contacting only sides of the image sensor facing away from the optical axis and not sides of the image sensor facing along the optical axis.

* * * * *